United States Patent
Herring, III

(10) Patent No.: US 11,687,046 B2
(45) Date of Patent: *Jun. 27, 2023

(54) SYSTEMS AND PROCESSES FOR OPTIMIZING OPERATION OF INDUSTRIAL EQUIPMENT

(71) Applicant: Georgia-Pacific LLC, Atlanta, GA (US)

(72) Inventor: Robert Hartwell Herring, III, Marietta, GA (US)

(73) Assignee: Georgia-Pacific LLC, Atlanta, GA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/526,037

(22) Filed: Nov. 15, 2021

(65) Prior Publication Data

US 2022/0155734 A1 May 19, 2022

Related U.S. Application Data

(63) Continuation of application No. 16/889,390, filed on Jun. 1, 2020, now Pat. No. 11,181,872.

(Continued)

(51) Int. Cl.
*G05B 13/04* (2006.01)
*G05B 13/02* (2006.01)
*D21F 7/00* (2006.01)

(52) U.S. Cl.
CPC ............. *G05B 13/042* (2013.01); *D21F 7/00* (2013.01); *G05B 13/0265* (2013.01)

(58) Field of Classification Search
CPC .......................... G05B 13/042; G05B 13/0265

(Continued)

(56) References Cited

U.S. PATENT DOCUMENTS

| 5,942,689 A | 8/1999 | Bonissone et al. |
| 6,466,877 B1 | 10/2002 | Chen et al. |

(Continued)

OTHER PUBLICATIONS

Bonissone, P. et al., "Predicting Wet-End Web Breakage in Paper Mills," Working Notes of the 2002 AAAI Symposium: Information Refinement and Revision for Decision Making: Modeling for Diagnostics, Prognostics, and Prediction, Technical Report SS-02-03, pp. 9 (2002).

(Continued)

*Primary Examiner* — Jigneshkumar C Patel

(57) ABSTRACT

A system for optimizing machine performance includes an optimization system and a data processing system. The data processing system records readings from data sources monitoring the performance of a machine and related aspects. The readings are processed at the optimization system and a machine learning model is trained to differentiate between data corresponding to an interval of optimal runtime performance and data corresponding to an interval of pre-error performance. The trained model is used to identify a subset of the various data sources that are most-predictive for a particular performance state of the machine, such as a pre-error performance state or an optimal runtime performance state. The subset of the various data sources are provided to a multivariate model for generating set-point recommendations for each of the most-predictive data sources. Visualizations are generated for providing real-time monitoring of deviations of the most-predictive data sources from the set-points associated therewith.

26 Claims, 7 Drawing Sheets

Related U.S. Application Data

(60) Provisional application No. 62/854,685, filed on May 30, 2019.

(58) Field of Classification Search
USPC .......................................................... 700/47
See application file for complete search history.

(56) References Cited

U.S. PATENT DOCUMENTS

| | | |
|---|---|---|
| 6,498,933 B1 | 12/2002 | Park et al. |
| 6,519,534 B2 | 2/2003 | Chen et al. |
| 6,522,978 B1 | 2/2003 | Chen et al. |
| 8,849,443 B2 | 9/2014 | Fries et al. |
| 9,069,345 B2 | 6/2015 | McCready et al. |
| 2010/0082120 A1 | 4/2010 | Stephenson et al. |
| 2010/0191361 A1* | 7/2010 | McCready ........... G05B 13/048 703/2 |

OTHER PUBLICATIONS

Bonissone, P.P. et al., When will it break? A Hybrid Soft Computing Model to Predict Time-to-break Margins in Paper Machines, Proceedings of SPIE 47th Annual Meeting, International Symposium on Optical Science and Technology, vol. 4787, pp. 53-64 (2002).

Imtiaz, S.A. et al., "Detection, Diagnosis and Root Cause Analysis of Sheet-Break in a Pulp and Paper Mill with Economic Impact Analysis." The Canadian Journal of Chemical Engineering, vol. 85, No. 4, pp. 512-525 (Aug. 2007).

\* cited by examiner

SYSTEMS AND PROCESSES FOR OPTIMIZING OPERATION OF INDUSTRIAL EQUIPMENT

CROSS-REFERENCE TO RELATED APPLICATION

This application is a continuation of U.S. patent application Ser. No. 16/889,390, filed Jun. 1, 2020, and which claims the benefit of and priority to U.S. Patent Application No. 62/854,685, filed May 30, 2019, entitled "SYSTEMS AND METHODS FOR OPTIMIZING OPERATION OF INDUSTRIAL EQUIPMENT." Each of the aforementioned applications is incorporated herein by reference in its entirety.

TECHNICAL FIELD

The present disclosure relates generally to systems and processes for optimizing operation and performance of industrial equipment, and more particularly to systems and methods for identifying, tracking, recommending and implementing stable operating conditions for industrial equipment, including industrial paper-making machines.

BACKGROUND

In an industrial environment, it is difficult to predict when issues may arise for a given piece of industrial equipment. Industrial equipment is typically operated for long periods of time, at rapid speeds and in a dynamic environment, which introduces a broad spectrum of factors (e.g., temperature, vibration, humidity, etc.) that may influence equipment performance and operation. To track performance states, industrial equipment typically includes many data sources (e.g., sensors, databases, lab tests, etc.), which provide data pertaining to machine conditions (e.g., environmental conditions, machine component performance, product conditions, etc.). However, because the many data sources often number in the hundreds to thousands, there is significant difficulty and complexity in determining which of the many data sources are most important and/or relevant for anticipating a particular performance state (e.g., an atypical or sub-optimal performance state). Furthermore, even if data from a set of the many data sources has been successfully identified as relevant for anticipating the particular performance state, an equipment operator must then monitor, in real time, the set of data sources (e.g., and outputs thereof), which may include dozens of metrics, thereby introducing to the task additional difficulty and complexity.

To further describe, by way of example only, the present issues in optimizing operation of industrial equipment, the above stated difficulties may be considered in a specific industrial context, such as in the operation of industrial papermaking equipment. A common technical issue of industrial papermaking machines is a paper break. Per the present disclosure, a "paper break" generally refers to fracture or tear of a paper product during its manufacture. Paper breaks are undesirable because they reduce productivity of paper making processes, thereby increasing energy, materials and time required to manufacture paper products. A common practice in alleviating costs imposed by paper breaks includes attempting to reduce the frequency with which paper breaks occur.

Previous systems for reducing paper break frequency in industrial papermaking machines leverage manual, one-pass techniques for reviewing data related to historical breaks (e.g., for the purposes of learning from paper machine conditions present at the time of a break). However, the previous systems fail to leverage paper machine performance data across a spectrum of time intervals and types including, but not limited to, pre-break intervals and ideal performance intervals. Accordingly, the previous systems are unable to identify, in real time or otherwise, ideal performance conditions or conditions that may precede or contribute to paper breaks. The previous systems are also unable to present a system user with an effective visualization of data source values and overall machine health, which is critical to maintaining effective and efficient performance monitoring. And, conventional techniques are unable to learn and adapt, in real time, to changing conditions or to identify and track data patterns that could optimize performance as they occur.

Thus, there is a long sought, but unmet need for systems and methods that identify variables that are most predictive for a particular performance state of a machine, and that further identifies optimal values for the variables to support monitoring of machine performance and for detecting potential deviations from optimal machine performance that may precipitate an error event, such as a paper break.

BRIEF SUMMARY OF THE DISCLOSURE

In various embodiments, described herein are systems and processes for identifying, tracking, recommending and implementing stable operating conditions for industrial equipment. The present disclosure contemplates use of the present system in any suitable industrial environment with any suitable industrial equipment. Without intended to limit the scope of the present disclosure, and for illustrative purposes only, description of the present system is provided in a context of machines involved in paper making processes.

In at least one embodiment, the present system leverages data transformations, machine learning environments and multivariate models to determine data sources, such as sensors, that are predictive for optimal or sub-optimal performance conditions of industrial machines. In one example, the system identifies a plurality of data sources in which the readings thereof are predictive for a pre-error machine state. According to one embodiment, the system computes set-points for the plurality of predictive data sources, the set-points being recommendations for an optimal value of readings from the data source for supporting an optimal performance in a machine associated with the plurality of data sources. In various embodiments, the system generates and trains machine learning models to classify datasets as being associated with a particular machine state. In one example, the system generates and trains a machine learning model to classify datasets as being associated with an optimal runtime machine state or a pre-error machine state. In one or more embodiments, the system generates effective real time visualizations of data sources including current and historical values of readings from the data sources, set-point values for each of the data sources as determined by the system, and metrics indicating overall machine health.

The present disclosure provides a system which performs actions including, but not limited to: 1) receiving data from a plurality of sources, the data describing an aspect of machine performance; 2) determining, via machine learning processes and/or manual selection, a set of data sources (e.g., from the plurality of sources) most relevant to a particular machine state; 3) computing one or more data set-points, wherein the set-points are recommended values of each data source (e.g., for promoting optimal performance, for avoiding a pre-error machine state, and etc.); and 4) generating real-time visualizations of readings for the determined set of data sources, wherein the visualization allows a system or machine operator to quickly and simultaneously monitor all of the received data and the set-points, and thereby predict and preemptively respond to potential changes in performance states of a machine. In some embodiments, the present systems enable automatic updating of machine set points or operating conditions in response to determined optimal data set points to further optimal operating conditions or to avoid machine or operational failures.

In one or more embodiments, the present system includes at least one processor operatively coupled to a data historian. In at least one embodiment, the data historian may include a server and one or more databases containing historical and real time raw performance data for one or more machines, such as, for example, one or more paper machines. Thus, in various embodiments, the data historian may be operatively connected to one or more data sources monitoring performance and various other parameters and conditions of one or more machines, and the data historian may receive raw performance data from the one or more data sources. In one embodiment, the system may associate an identifier with each of the one or more data sources, wherein the identifier identifies the data source and a particular machine to which the data source relates. In some embodiments, the at least one processor may be operative to communicate with the data historian via an application programming interface (API) for various purposes, such as, for example, requesting a particular set of data stored with the data historian. In one or more embodiments, the system may be operatively connected to one or more computing devices (e.g., to which a user may provide inputs via GUI's, keyboards, voice commands, etc.), and the system may be responsive to commands or requests entered therein by a user.

In various embodiments, the present system includes at least two software engines or primary functionalities. In one or more embodiments, a first software engine of the system is a model engine that constructs and executes one or more machine learning models. In at least one embodiment, a second software engine of the system is a streaming engine. According to one embodiment, the streaming engine performs calculations and analyses in support of the model engine and generates visualizations associated with performance data of one or more machines. In one embodiment, the at least two software engines, or functions thereof, may be performed by a single software module, engine, or the like.

In various embodiments, the system receives raw data from the data historian and processes (e.g., as described later herein) the raw data to obtain a cleaned raw dataset, which may be used a training dataset for training one or more machine learning models. The raw data may be associated with data sources associated with a particular machine and with a machine environment in which the particular machine is located. In one or more embodiments, the system separates the cleaned raw dataset into one or more secondary cleaned data sets, wherein each of the one or more secondary cleaned data sets may be associated with a specific grade or type of product processed by the particular machine. In one example, the particular machine is a paper making machine and the system separates the cleaned dataset into a plurality of secondary datasets in which each secondary dataset is associated with a particular grade of paper processed by the particular paper making machine.

In at least one embodiment, the system generates one or more optimal runtime datasets by identifying and extracting segments of optimal performance data from each of the one or more secondary cleaned datasets. Per the present disclosure, when used as a descriptive term, "optimal" generally refers to a performance state of a machine in which the performance state is of an ideal or otherwise preferred condition. For example, an optimal runtime dataset may include machine temperature data from a data source associated with a machine, wherein the temperature data may be "optimal" because no paper breaks occurred on the machine during the period the temperature data was collected. In the same example, the temperature data may be "optimal" because a range of the data is determined to be within an established best practices range for the machine associated with the data source. In some embodiments, the system creates one or more pre-error datasets from the one or more secondary datasets, wherein the one or more pre-error datasets includes data associated with performance of a machine preceding an error event, such as a paper break (e.g., in the context of paper making machines). Per the present disclosure, "pre-error" refers to a period of time closely preceding an error event, such as a paper break, and, thus, "pre-break" is considered sub-optimal as described herein. For example, data contained in a pre-error dataset of a particular paper making machine may refer to data collected during a time period preceding a paper break on the particular paper making machine.

In one or more embodiments, the system further refines the one or more optimal runtime datasets in a manner such that data contained therein may be implemented in a machine learning environment. In various embodiments, the system trains a machine learning model, such as a random forest classification model, to classify datasets as either optimal runtime or pre-error. According to one embodiment, the system performs feature importance measurement and mutual information classification processes on the classification outputs of the trained machine learning model to determine one or more data sources (e.g., performance and/or sensor metrics functioning as X-variables of the machine learning environment) that are most predictive in differentiating between optimal runtime and pre-break datasets. In at least one embodiment, the system uses the determined one or more data sources to generate a principal component analysis (PCA)-based multivariate model of optimal machine performance and, thereby, identify an optimal set-point for each of the one or more data sources. In some embodiments, the system determines the one or more data sources by selecting a predefined number of data sources via the machine learning environment, and optionally selecting an additional predefined number of data sources through receipt of one or more identifier selection inputs from a user. In one example, a user inputs one or more identifiers to the system, wherein the identifiers identify a particular data source associated with a particular machine. The present disclosure contemplates determination of any number of optimal runtime- or pre-error-predictive data sources via the machine learning environment, and further contemplates selection of any number of data sources via manual inputs.

In various embodiments, the system determines one or more recommended set points for each of the one or more data sources selected by the system (whether through machine learning methods or from identifier selections input by a user). Per the present disclosure, a "set-point" generally refers to a value of data (e.g., from a data source) that is most desirable for and/or associated with optimal performance in a machine (e.g., a machine associated with the data source) or, in some embodiments, associated with avoiding pre-error performance in a machine. In one example, a set-point for a temperature data source (e.g., a thermistor, or the like) is a temperature at which machine throughput is maximized and conditions leading to a paper break (e.g., high temperatures) are minimized. Thus, in various embodiments, a set-point refers to a value of a data source at which optimal machine performance may be achieved and maintained, and at which non-optimal machine performance may be minimized. In one or more embodiments, the present system constructs a PCA-based multivariate model using the one or more data sources that were determined predictive and trains the model on the one or more optimal runtime datasets. In one example, the multivariate model is a PCA-based model of a paper machine during an optimal state of operation. In at least one embodiment, the system executes the model and receives, as an output, the one or more recommended set-points for the one or more data sources (e.g., and for each grade associated with each of the one or more data sources). In various embodiments, the system utilizes PCA for the purposes of reducing dimensionality of each of the one or more optimal runtime data sets, and capturing the underlying variability of each of the one or more optimal runtime datasets, while avoiding overfitting the data included therein.

In various embodiments, the system generates and renders (e.g., on a display operatively connected to the system) a visualization of machine performance including historical and current values of a plurality of data sources determined to be predictive for a pre-error performance state. In at least one embodiment, the visualization includes, but is not limited to, the one or more data sources determined to be predictive and, in some embodiments, one or more data sources manually selected by a user, wherein each of the one or more data sources are labeled with an identifier associated therewith. In one or more embodiments, the visualization includes the one or more recommended set-points produced by the system, one or more additional metrics associated with the one or more data sources, and/or additional identifying information associated with each of the one or more data sources. In one example, the visualization is an intensity map (also referred to as a "heat" map) that tracks deviations in the values of data source readings from determined set-point values, or from other values, such as a median value for optimal runtime. In the same example, the intensity map uses color hue and/or intensity to indicate a magnitude of deviation (e.g., computed as a standard deviation between the value of the reading and the set-point or media value). In one or more embodiments, the data visualization includes a graphical chart, wherein the graphical chart includes one or more trend lines providing an approximation of overall machine health. As described herein, a heat map or intensity map can be used as a tool to enable quick visualization by a system user of various data set points, and issues associated therewith, as colors or other visual identifiers identifying deviations from optimal performance can be easily seen and identified.

In various embodiments, the system generates remedial data from data provided by the data historian. For example, the system may identify pre-error data that historically did not result in a break and determine one or more corrective actions that were taken to mitigate pre-error conditions on an associated machine. In one or more embodiments, the remedial data includes, but is not limited to, information regarding one or more corrective actions that would be performed by a machine operator (whether human or otherwise) in response to a pre-error performance state of a machine (e.g., as indicated by a visualization of predictive data sources associated with the machine or by classification of a current set of machine data as pre-error by a trained machine learning model). Thus, the corrective actions may include information providing actions that may return a paper machine to a state of optimal performance.

In one example, determined corrective actions for a non-optimal temperature state of a paper machine may include, but are not limited to decreasing a reel speed parameter of a particular machine component (e.g., to reduce heat generation and, thus, operating temperature), removing papermaking waste from the paper machine, and/or increasing throughput of a paper machine cooling system. In at least one embodiment, the retrieval of remedial data and determination of corrective actions occurs in response to a detected a pre-error machine state, in response to detection of one or more current data source values deviating from set-point values beyond a predetermined threshold, or in response to user input, such as an requesting remedial data associated with a current machine state. In various embodiments, the system renders remedial data on a visualization of machine performance. In one example, the visualization is an intensity map and the system generates a pop-up window adjacent to each of one or more data sources determined to have deviated to a pre-error state, the pop-up window including a the current value of the data source, a historical value of the data source, a set-point value of the data source, and text identifying one or more corrective actions that may be taken to potentially return the data source to a value within a predetermined threshold.

In various embodiments, the system receives a command (e.g., from a user) to execute one or more corrective actions associated with the remedial data. In one or more embodiments, upon receipt of the command, the system automatically performs the one or more corrective actions and/or may communicate the one or more corrective actions to a machine operator (e.g., who then performs the one or more corrective actions). For example, when a system determines that a given set of operational data exceeds some predefined threshold, the system can alert a user to take action to change the operational state of a corresponding machine. Further, in some embodiments, the system can remotely control and automatically update the operational conditions of the respective machine based on out-of-band data conditions.

According to one aspect, systems and methods for optimizing machine operation, comprising: A) retrieving historical data corresponding to operation of a machine, wherein the historical data comprises readings from a plurality of data sources associated with the machine; B) generating a training dataset for training a machine learning model based on the historical data, wherein the training dataset comprises: 1) a first subset of the readings associated with a plurality of optimal runtime time intervals for the machine; and 2) a second subset of the readings associated with a plurality of pre-error time intervals for the machine; C) training the machine learning model to classify data source datasets as either optimal runtime or pre-error using the training dataset; D) executing the trained machine learning model on a test dataset comprising time series readings from the plurality of data sources associated with the machine, resulting in the trained machine learning model classifying the test dataset as optimal; E) generating, from the trained machine learning model, an importance value for each of the plurality of data sources, wherein the importance value comprises a measure of each data source's statistical importance in contributing to classification of the test dataset by the trained machine learning model as optimal; F) generating a correlation value for each of the plurality of data sources, wherein the correlation value comprises a measure of the correlation between each respective data source and the classification of the dataset as optimal; G) generating a multivariate model based on the importance values and the correlation values for each of the plurality of data sources; H) determining, based on the multivariate model, an optimal set-point for each of the plurality of data sources; I) receiving virtually real time data from one or more of the plurality of data sources corresponding to current operation of the machine; and J) comparing the virtually real time data to each respective optimal set-point for the one or more of the plurality of data sources to determine whether the virtually real time data corresponds to an optimal or pre-error machine state.

According to a further aspect, the systems and methods of the first aspect or any other aspect, wherein each data source of the plurality of data sources corresponds to a physical sensor operatively connected to the machine.

According to a further aspect, the systems and methods of the first aspect or any other aspect, wherein generating the multivariate model further comprises: A) initializing the multivariate model with a predictive subset of the plurality of data sources determined based on the importance value and the correlation value of each of the plurality of data sources; and B) training the multivariate model to simulate an optimal performance state of the machine, wherein the training is performed using a segment of the first subset corresponding to the predictive subset.

According to a further aspect, the systems and methods of the first aspect or any other aspect, further comprising the steps of: A) combining the importance value and the correlation value for each of the plurality of data sources to generate a combined value; and B) generating a ranking of the plurality of data sources based on the combined value for each of the plurality of data sources.

According to a further aspect, the systems and methods of the first aspect or any other aspect, wherein the multivariate model is generated based on a subset of top-ranked data sources from the ranking of the plurality of data sources.

According to a further aspect, the systems and methods of the first aspect or any other aspect, further comprising generating a visualization of the comparison of the virtually real time data to each respective optimal set-point for the one or more of the plurality of data sources.

According to a further aspect, the systems and methods of the first aspect or any other aspect, wherein the visualization comprises an intensity map.

According to a further aspect, the systems and methods of the first aspect or any other aspect, wherein the comparison comprises analyzing the intensity map to identify visual identifiers suggesting deviations from the optimal set point for the one or more of the plurality of data sources.

According to a further aspect, the systems and methods of the first aspect or any other aspect, wherein the second subset excludes the first subset.

According to a second aspect, systems and methods for optimizing paper-making machine operation, comprising: A) retrieving historical data corresponding to operation of a paper-making machine, wherein the historical data comprises readings from a plurality of data sources associated with the paper-making machine; B) generating a training dataset for training a machine learning model based on the historical data, wherein the training dataset comprises: 1) a first subset of the readings associated with a plurality of optimal runtime time intervals for the paper-making machine; and 2) a second subset of the readings associated with a plurality of pre-break time intervals for the paper-making machine, wherein the pre-break time intervals correspond to time periods during which a paper sheet within the paper-making machine is nearing a tearing condition; C) training the machine learning model to classify data source datasets as either optimal runtime or pre-break using the training dataset; D) executing the trained machine learning model on a test dataset comprising time series readings from the plurality of data sources associated with the paper-making machine, resulting in the trained machine learning model classifying the test dataset as pre-break; F) generating, from the trained machine learning model, an importance value for each of the plurality of data sources, wherein the importance value comprises a measure of each data source's statistical importance in contributing to classification of the test dataset by the trained machine learning model as pre-break; G) generating a correlation value for each of the plurality of data sources, wherein the correlation value comprises a measure of the correlation between each respective data source and the classification of the dataset as pre-break; H) generating a multivariate model based on the importance values and the correlation values for each of the plurality of data sources; I) determining, based on the multivariate model, a pre-break set-point for each of the plurality of data sources; J) receiving virtually real time data from one or more of the plurality of data sources corresponding to current operation of the paper-making machine; and K) comparing the virtually real time data to each respective pre-break set-point for the one or more of the plurality of data sources to determine whether the virtually real time data corresponds to an optimal or pre-break machine state.

According to a further aspect, the systems and methods of the second aspect or any other aspect, wherein each data source of the plurality of data sources corresponds to a physical sensor operatively connected to the paper-making machine.

According to a further aspect, the systems and methods of the second aspect or any other aspect, wherein generating the multivariate model further comprises: A) initializing the multivariate model with a predictive subset of the plurality of data sources determined based on the importance value and the correlation value of each of the plurality of data sources; and B) training the multivariate model to simulate a pre-break performance state of the paper-making machine, wherein the training is performed using a segment of the second subset corresponding to the predictive subset.

According to a further aspect, the systems and methods of the second aspect or any other aspect, further comprising the steps of: A) combining the importance value and the correlation value for each of the plurality of data sources to generate a combined value; and B) generating a ranking of the plurality of data sources based on the combined value for each of the plurality of data sources.

According to a further aspect, the systems and methods of the second aspect or any other aspect, wherein the multivariate model is generated based on a subset of top-ranked data sources from the ranking of the plurality of data sources.

According to a further aspect, the systems and methods of the second aspect or any other aspect, further comprising generating a visualization of the comparison of the virtually real time data to each respective pre-break set-point for the one or more of the plurality of data sources.

According to a further aspect, the systems and methods of the second aspect or any other aspect, wherein the visualization comprises an intensity map.

According to a further aspect, the systems and methods of the second aspect or any other aspect, wherein the comparison comprises analyzing the intensity map to identify visual identifiers suggesting deviations from the pre-break set point for the one or more of the plurality of data sources.

According to a further aspect, the systems and methods of the second aspect or any other aspect, wherein the second subset excludes the first subset.

According to a third aspect, systems and methods for virtually real time monitoring of machine performance, comprising: A) identifying one or more data sources corresponding to operation of a machine; B) determining an optimal set-point for each of the one or more data sources as determined according to a machine learning model; C) receiving virtually real time data from the one or more data sources corresponding to current operation of the machine; D) computing a standard deviation between the virtually real time data and the optimal set-point for each of the one or more data sources; and E) rendering an intensity map on a display, wherein the intensity map represents the computed standard deviation according to a predefined visual gradient.

According to a further aspect, the systems and methods of the third aspect or any other aspect, wherein each data source of the one or more data sources corresponds to a physical sensor operatively connected to the machine.

According to a further aspect, the systems and methods of the third aspect or any other aspect, wherein the machine is a paper-making machine.

According to a further aspect, the systems and methods of the third aspect or any other aspect, wherein the virtually real time data corresponds to a particular time period and the computed standard deviation varies over the particular time period.

According to a further aspect, the systems and methods of the third aspect or any other aspect, wherein the predefined visual gradient comprises a color gradient.

According to a further aspect, the systems and methods of the third aspect or any other aspect, wherein a set of colors in the color gradient corresponds to an intensity scale derived according to a scaled normal distribution about the set-point.

According to a further aspect, the systems and methods of the third aspect or any other aspect, wherein: A) the intensity scale comprises scaled standard deviation thresholds; and B) rendering the intensity map further comprises: 1) generating at least one sampling frame for each of the one more data sources; 2) scaling the standard deviation of each of the one or more data sources to the intensity scale; and 3) rendering the at least one sampling frame for each of the one or more data sources on the intensity map, wherein a color of each sampling frame is derived from a comparison between the scaled standard deviation value and the scaled standard deviation thresholds.

According to a further aspect, the systems and methods of the third aspect or any other aspect, wherein: A) the set of colors in the color gradient comprises a first subset of colors associated with lower scaled standard deviations thresholds and a second subset of colors associated with higher scaled standard deviation thresholds; B) the first subset of colors trends toward colors of shorter wavelengths; and C) the second subset of colors trends toward colors of longer wavelengths.

These and other aspects, features, and benefits of the claimed systems and methods will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
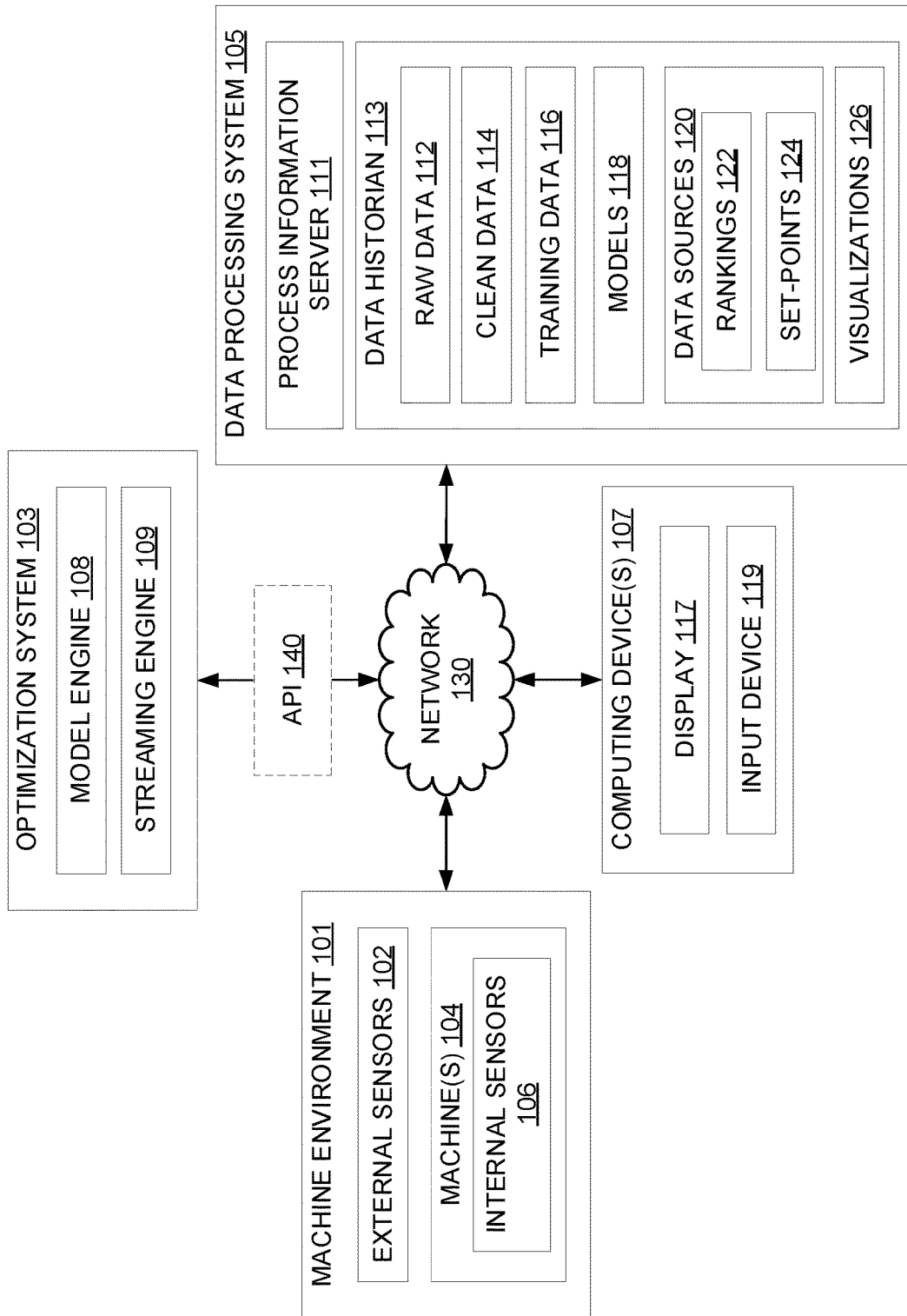
FIG. 1 is a system overview diagram illustrating an exemplary networked environment according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "raw data" generally refers to inputs obtained directly from a sensor, wherein the inputs have not been subjected to data cleaning or segmentation processes described herein. In various embodiments, raw data may include, but is not limited to, data obtained from sensors installed on a machine, data obtained from sensors installed elsewhere in the paper making operation, and data obtained from manual observations, analyses and/or tests corresponding to performance of a machine. In at least one embodiment, sensors installed on a machine may include, but are not limited to, temperature sensors, accelerometers, photodetectors, piezometers, level sensors, pressure sensors, current sensors, voltage detectors, and other sensors capable of transducing physical phenomena into electrical signals.

As used herein, "clean data" generally refers to raw data that has been subjected to one or more data cleaning processes described herein. In one or more embodiments, the one or more data cleaning processes include, but are not limited to, null value removal, data imputation, coefficient of variance filtering, variable correlation filtering, categorical variable filtering, missing values filtering, and other suitable processes.

As used herein, the term "data source" generally refers to the source of data, such as sensors monitoring conditions or phenomena occurring in a machine or in an environment in which the machine is located. In at least one embodiment, the term data source includes metrics that are computed from combining readings of a particular sensor or by combining readings of one or more sensors. In various embodiments, variables used by various models described herein are generated from data sources.

As used herein, the terms "preferred runtime" dataset, "typical runtime," "optimal runtime," and "good runtime" generally refer to a collection of data that are of an ideal or otherwise preferred condition. In at least one embodiment, a dataset described by the preceding terms represents a chosen time interval, wherein the associated machine operated in an optimal state. For example, data in a preferred runtime dataset may represent performance metrics of the machine during a preferred, typical, and/or optimal performance state.

As used herein, the terms "pre-error" dataset and "pre-break" dataset generally refer to a collection of data associated with a time period closely preceding an error event, such as a machine malfunction or failure, or a malfunction or failure in a material or product being processed by a machine. For example, data contained in a pre-break dataset of a particular machine may refer to data collected during a time period preceding a paper break on the particular machine. In another example, a pre-break dataset includes data associated with a time period immediately preceding detection of a paper curl in paper being processed through a particular paper making machine.

As used herein, a "paper break" generally refers to an error event in which paper being made, processed, treated, or transported on a paper making machine experiences a partial or total rupture while passing through the machine.

As used herein, "curl" generally refers to an error event in which paper experiences a deformation caused by non-uniform distribution of strains and stresses through the sheet, for example, as a result of uneven internal moisture conditioning and/or other factors.

As described herein, aspects of the present system may be used in connection with paper-making machines. In various embodiments, the paper used in these machines may be of any variety including, but not limited to, anti-tarnish paper, backs, base stock, binders board, board, bogus, bond, book paper, Bristol board, calendar-finished paper, carbonizing paper, carbonless paper, cast-coated paper, chipboard, combination board, combined board, construction paper, container board, corrugated board, corrugating medium, cover paper, crepe paper, cut-size paper, duplex paper, electrostatic copy paper, fine papers, fluorescent paper, free sheet, glassine paper, groundwood paper, hard-sized paper, industrial papers, kraft paper, laminated paper, linerboard, machine-coated paper, machine-finished paper, machine-glazed paper, manifold mapper, matte paper, multi-ply paper, newsprint, ninepoint, onionskin, packaging paper, pressure sensitive paper, recovered paper, register paper, release paper, secondary fiber paper, solid board, text paper, tissue paper, vegetable parchment, white paper, and other varieties.

Overview

Aspects of the present disclosure generally relate to analyzing and, in some embodiments, modeling machine performance to identify predictive metrics for machine errors and to compute optimal set-points for the identified metrics. The present disclosure describes, for illustrative purposes, embodiments of the systems and methods as applied to industrial paper making machines.

In various embodiments, described herein is a system for identifying, tracking, recommending and implementing stable operating conditions for industrial equipment. The present disclosure contemplates use of the present system in any suitable industrial environment with any suitable industrial equipment. For illustrative purposes only, description of the present system is provided in a context of machines involved in paper-making processes. In at least one embodiment, the present system leverages data transformations, machine learning environments and multivariate models to consistently identify optimal and sub-optimal performance conditions, dynamically identify a set of data sources and data values most indicative of optimal performance and sub-optimal performance, and present effective real time visualizations of actual operational and performance data values, optimal data values and overall machine health.

Exemplary Embodiments

Referring now to the figures, for the purposes of example and explanation of the fundamental processes and components of the disclosed systems and methods, reference is made to FIG. 1, which illustrates an exemplary, high-level overview of one embodiment of the present system 100. As will be understood and appreciated, the exemplary system 100 shown in FIG. 1 represents merely one approach or embodiment of the present system, and other aspects are used according to various embodiments of the present system.

In various embodiments, the system 100 includes a machine environment 101 including a plurality of external sensors 102 and one or more machines 104, each machine 104 including a plurality of internal sensors 106. According to one embodiment, each external sensor 102 and internal sensor 106 is in communication with a data processing system 105 via a network 130. In at least one embodiment, the external sensors 102 and internal sensors 106 are represented as data sources 120 in the data processing system 105. In one or more embodiments, the external sensors 102 and internal sensors 106 transmit readings related to conditions of and phenomena occurring in the machine environment 101 or a particular machine 104, and the readings are stored by the data processing system 105 and associated with a corresponding data source 120.

In one or more embodiments, the system 100 includes an optimization system 103 for optimizing operation of one or more machines 104 based on analysis and modeling techniques executed on data from the data processing system 105. According to one embodiment, the data processing system 105 and optimization system 103 are a shared system of centrally-located and/or cloud-hosted computing resources. In some embodiments, the data processing system 105 and optimization system 103 are separate systems. In one example, an application programming interface (API) 140 facilitates communication between the data processing system 105 and optimization system 103. In at least one embodiment, the API 140 is an Open Systems Interconnection ("OSI") Process Information ("PI") Web API, which is available in Python programming language. In one embodiment, an asset framework software developer kit is used to provide the API 140.

In various embodiments, the optimization system 103 and data processing system 105 coordinate to performs actions, including, but not limited to: 1) receiving data from a plurality of sources, the data describing an aspect of machine performance; 2) selecting, via machine learning processes and/or manual election, a set of data sources (e.g., from the plurality of sources) most relevant to a particular machine state; 3) computing one or more data set-points, wherein the set-points are recommended values of the set of data sources (e.g., for promoting optimal performance); and 4) generating real-time visualization of the data received from the selected set of data sources, wherein the visualization allows a system operator to quickly and simultaneously monitor all of the received data and the set-points.

In at least one embodiment, the system 100 includes one or more computing devices 107 that allow a user to access the optimization system 103 and data processing system 105 and provide inputs thereto, such as, for example, requests for information regarding a current performance state of a machine 104. In one or more embodiments, a computing device 107 includes a display 117 for rendering various screens, interfaces, and etc. In one example, the display 117 renders one or more visualizations 126 for optimization and monitoring of a particular machine 104, the one or more visualizations 126 being generated at the optimization system 103 and retrieved from the data processing system 105. According to one embodiment, a computing device 107 includes an input device 119 for receiving various selections and other inputs from a user. In one example, a user uses an input device 119 to select a particular machine 104 from a list of machines, the selection causing a visualization 126 associated with the particular machine 104 to be rendered on the display 117. In one or more embodiments, the computing device 107 includes a Distributed Control System (DCS) interface (e.g., in the form of a virtual portal and/or a set of physical controls), in which a user may automatically or manually, or by combination, adjust one or more set-points 124 or other parameters related to monitoring and control of a machine 104 or machine environment 101. In one example, the DCS interface allows a user to indicate that one or more corrective actions have been performed to address a deviation by a data source 120 from a set-point 124. In the same example, the input of the user causes the optimization system 103 to recalculate the set-point 124 of the data source 120 or to update a visualization 126 with a recalculated metric for overall health of a machine 104 associated with the data source 120.

In some embodiments, the machine environment 101 is a particular facility, complex, building, or a particular area thereof. The machines 104 included in the machine environment 101 may or may not be present in the same area or facility. For example, a first set of machines 104 may be located at a first facility of a machine environment 101 and a second set of machines 104 may be located at a second facility of the machine environment 101. In some embodiments, the system 100 includes a plurality of machine environments 101.

According to one embodiment, each machine environment 101, external sensor 102, machine 104, and internal sensor 106 includes an identifier for uniquely identifying the environment, machine, or sensors, as well as data and metadata associated therewith. In at least one embodiment, the identifiers are associated with one or more databases or data structures, such as look-up tables, for storing information associated with machine environment 101, machines 104, external sensors 102, and internal sensors 106. In some embodiments, an identifier of an internal sensor 106 includes information associated with a particular machine 104 in which the internal sensor 106 is configured. For example, an identifier for an internal sensor 106 includes a first string or sequence uniquely associated with the internal sensor 106 and a second string or sequence uniquely associated with a particular machine 104. In one or more embodiments, an identifier of an external sensor 102 or machine 104 includes information associated with a particular machine environment 101 in which the external sensor 102 or machine 104 is located.

In various embodiments, an external sensor 102 refers to any sensor that records conditions of or transduces phenomena occurring in a machine environment 101 and external to one or more machines 104 therein. Non-limiting examples of external sensors 102 include, but are not limited to, environmental temperature, pressure, vibration, and humidity sensors, as well as other sensors for monitoring flow of material through a production or assembly line (e.g., a collection of machines 104). In one example, an external sensor 102 is a sensor that monitors a speed of a conveyor supplying paper to a machine 104. In another example, an external sensor 102 is a sensor that monitors a flow rate of pulp being pumped into a machine 104.

In one or more embodiments, an internal sensor 106 refers to any sensor that records conditions of or transudes phenomena occurring in a machine 104. Non-limiting examples of internal sensors 106 include, but are not limited to, temperature sensors, accelerometers, photodetectors, piezometers, level sensors, pressure sensors, current sensors, voltage detectors, and other sensors configured for transducing physical phenomena into electrical signals. In one example, an internal sensor 106 is a negative pressure sensor configured for measuring a vacuum force provided in a particular machine 104. In another example, an internal sensor 106 is an optical encoder for measuring rotational speed of a portion of a particular machine 104.

In at least one embodiment, the data processing system 105 is configured for receiving and storing data from the machine environment 101, optimization system 103, and one or more computing devices 107. In various embodiments, the data processing system 105 includes a process information ("PI") server 111 for communicating with the machine environment 101, optimization system 103, and one or more computing devices 107 via the network 130. The PI server 111 may include a plurality of servers. In one or more embodiments, the PI server 111 hosts and/or serves visualizations 126. For example, in response to a request from a user, the PI server 111 serves a visualization 126 to a computing device 107. In various embodiments, the PI server 111 provides web address for accessing or streaming visualizations 126 (e.g., streaming being supported by the streaming engine 109).

In one or more embodiments, the data processing system 105 includes one or more processors for processing data and responding to data-related requests (e.g., requests for serving of particular data) from the optimization system 103 or one or more computing devices 107. In one or more embodiments, the data processing system 105 includes a data historian 113 for organizing and storing various data in one or more databases. In one or more embodiments, the data historian 113 includes data for each machine 104 of a machine environment 101 and data pertaining to the overall machine environment 101. In at least one embodiment, the data historian 113 is configured to communicate with a Distributed Control System (DCS), such that the DCS may be provided with set-points 124 in various control schemes for controlling one or more machines 104 (for example, Proportional-Integral-Derivate ("PID") schemes).

In at least one embodiment, information stored by the data historian 113 includes, but is not limited to, raw data 112, clean data 114, training data 116, models 118, data sources 120, and visualizations 126. In one or more embodiments, raw data 112 includes historical and current readings from the external sensors 102 and internal sensors 106, the readings having not been subjected to filtering or other data cleaning methods discussed herein. For example, raw data 112 for an internal reel speed sensor 106 includes a time-series of reel speed values corresponding to readings sampled from the internal speed sensor 106. In one or more embodiments, the raw data 112 may include, but is not limited to, data obtained from sensors installed on a machine, data obtained from sensors installed elsewhere in the paper making operation, and data obtained from manual observations, analyses and/or tests corresponding to performance of a machine. In some embodiments, raw data 112 is received from one or more computing devices, for example, as a result of a user providing selections or entries using the input device 119.

According to one embodiment, clean data 114 includes historical and current readings from the external sensors 102 and internal sensors 106, the readings having been subjected to one or more data cleaning methods described herein. In one or more embodiments, training data 116 includes various datasets extracted from clean data 114 that are used for models 118 discussed herein. For example, training data 116 includes optimal runtime datasets and pre-error datasets extracted from clean data 114, the datasets being used to train a random forest classification model to determine whether an input dataset is associated with an optimal runtime or a pre-error time period. According to one embodiment, the training data 116 includes a plurality of training datasets and a plurality of test datasets. In one or more embodiments, each of the plurality of training datasets and each of the plurality of test datasets includes one or more optimal runtime datasets and one or more pre-error datasets.

In one or more embodiments, models 118 include models generated and trained by the optimization system 103. In at least one embodiment, the models 118 include, but are not limited to, classification models and multivariate models. In one example, models 118 include various untrained and trained iterations of random forest classification models for classifying a dataset as optimal runtime or pre-error and for determining rankings 122 of data sources 120. In another example, models 118 may include multivariate models for simulating optimal performance of a machine 104 and for determining set-points 124 of data sources 120. In at least one embodiment, the models 118 may leverage random forest classification and mutual information classification techniques to produce a plurality of predictive models 118 that are iteratively more predictive (e.g., more accurate in correctly classifying a dataset as optimal runtime or pre-break). In various embodiments, a most predictive model 118 is used to identify a set of X-variables (e.g., data sources 120) that are most predictive for pre-error performance states of a particular machine 104.

In various embodiments, data sources 120 include information related to external sensors 102, internal sensors 106, and other variables analyzed at the optimization system 103 for the purposes of identifying, recommending and tracking stable operating conditions of one or more machines 104. Thus, in various embodiments, the data historian 113 may be operatively connected to one or more data sources 120 associated with performance metrics of one or more machines 104, and the data historian may receive raw performance data from the one or more data sources 120. In at least one embodiment, the data sources 120 include the identifiers for each external sensor 102 and internal sensor 106, as well as identifiers for additional variables (e.g., combinations of sensor readings, etc.). In an exemplary scenario involving optimization of one or more paper making machines, non-limiting examples of raw data 112 from data sources 120 include, but are not limited to, reel section speed, current basis weight, current basis moisture level, basic sheet caliper, one or more through-air drying (TAD) supply temperatures, Yankee speed, total headbox water, one or more pine refiner specific energies (where specific energy is measured as total horsepower days per ton (HPD/T)), one or more tickler specific energies, wet strength usage, one or more transfer box vacuum pressures, one or more dewatering box vacuum pressures, one or more moulding box vacuum pressures, ambient air temperature (e.g., in a machine environment 101 in which the machine 104 is located), tending side (TS) pressure, drive side (DS) pressure, one or more TAD gas usage levels, one or more motor loads, one or more cooling tower return temperature, under-the-machine (UTM) pulper pumpout pressure, UTM pulper exhaust rate, blend chest hot water flow, chest level (e.g., chest being a vessel for storing and treating pulp), lubricant flow, and various other readings from data sources 120.

According to one embodiment, the data sources 120 include one or more rankings 122 for each data source 120. In various embodiments, a ranking 122 refers to a determined level of predictive power the data source 120 demonstrates for predicting an error event or pre-error interval. In some embodiments, a data source 120 includes multiple rankings 122, in which each ranking 122 is associated with a set of external conditions (e.g., a particular time period, time of year, level of machine wear, etc.). Determinations of rankings 122 are further discussed herein with reference to FIGS. 2 and 3. In at least one embodiment, the data sources 120 include set-points 124 that provide ideal values at which the data sources 120 are associated with optimal runtime performance on a corresponding machine 104. In one example, set-points 124 are computed at the optimization system 103 and provide ideal values for external sensors 102 and internal sensors 106 associated with a particular machine 104. In the same example, the set-points 124 have been identified as values of sensor readings that are most conducive to optimal performance of the particular machine 104.

In at least one embodiment, an output of the optimization environment 103 includes one or more of, but is not limited to, a trained model 118 for classifying datasets as optimal runtime or pre-error and for identifying data sources 120 predictive of a particular performance state. The optimization environment 103 may include rankings 122 of data sources 120, in which the rankings 122 correspond to predictive power of each of the data sources 120 for predicting a pre-error performance state of a machine 104. The optimization system may include a multivariate model 118 for determining set-points 124 of the predictive data sources 120 and for controlling rendering of a visualization 126. According to one embodiment, the optimization system 103 generates one or more visualizations 126 that are stored by the data historian 126. In at least one embodiment, the visualizations 126 provide real-time visual representations of top-ranked data sources 120 (e.g., as determined by rankings 122), as well as set-points 124 associated with the data sources 120 and indicia indicating a current value of each data source 120. In various embodiments, the visualizations 126 include, but are not limited to, intensity maps, heat maps, radar charts, and other data visualizations for illustrating current values of data sources 120 (e.g., of external sensors 102 and internal sensors 106) and set-points 124 associated therewith.

In one or more embodiments, the visualization 126 is an intensity map in which intensity is a deviation of a value of a data source 120 from a set-point 124 or other value, and in which a color scheme (e.g., transitioning from blue to red) or other visual identifier denotes increasing deviation from the set-point 124. In at least one embodiment, the visualization 126 includes remedial data and one or more corrective actions associated with a particular machine state (e.g., a pre-error state). In various embodiments, in response to determining that one or more data sources deviate from set-points 124 in excess of predetermined thresholds, the optimization system automatically updates a visualization 126 to include remedial data and one or more corrective actions associated with the one or more data sources 120.

In various embodiments, the optimization system includes a model engine 108 and a streaming engine 109. In some embodiments, each engine includes a distinct set of computing resources and software. In alternate embodiments, the engines include a shared set of computing resources. According to one embodiment, the model engine 108 and the streaming engine 109 each include one or more servers for communicating, via the network 130 and the API 140, with the machine environment 101, the data processing system 105, and one or more computing devices 107. In at least one embodiment, the model engine 108 generates and execute models, such as machine learning models for dataset classification and generation of rankings 122, and multivariate principal component analysis (PCA) models for generating set-points 124. In one or more embodiments, the streaming engine 109 may perform calculations and generate visualizations 118 associated with one or more machines 104 (e.g., and external sensors 102 and internal sensors 106 associated therewith). In various embodiments, the streaming engine 109 executes one or more scripts related to data access (e.g., retrieving data from the data processing system 105) and performing various calculations for computing importance scores, correlation scores, combined scores, and other metrics described herein. In various embodiments, the streaming engine 109 includes a Process Information ("PI") Asset Framework ("AF"), which establishes a consistent data source architecture for accessing data from the data historian 113. In at least one embodiment, functions of the model engine 108 and streaming engine 109 are performed by a single software module, engine, or the like.

According to one embodiment, the network 130 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

Figure 2:
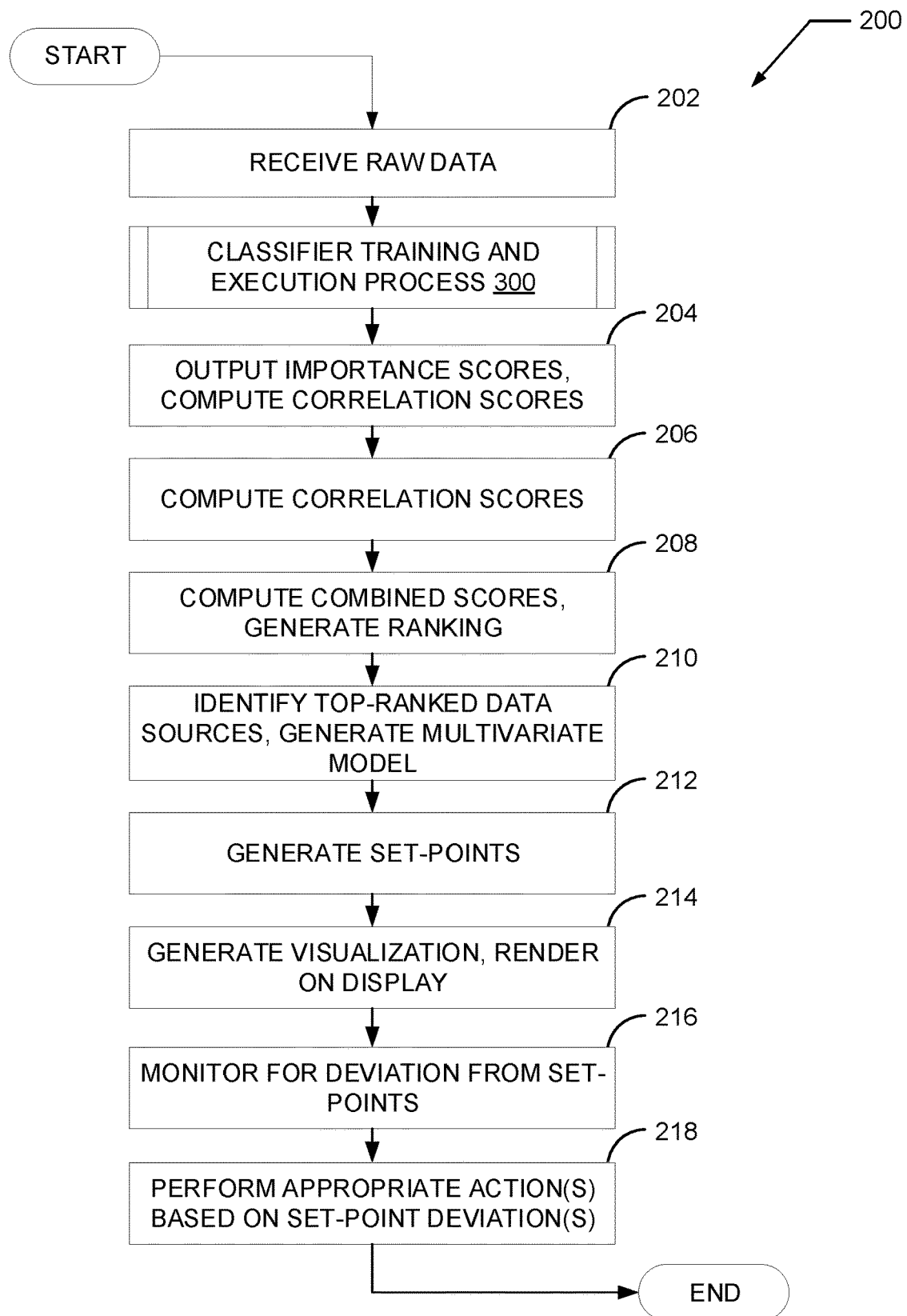
FIG. 2 is a flowchart of an exemplary machine optimization process according to one embodiment of the present disclosure.
Figure 3:
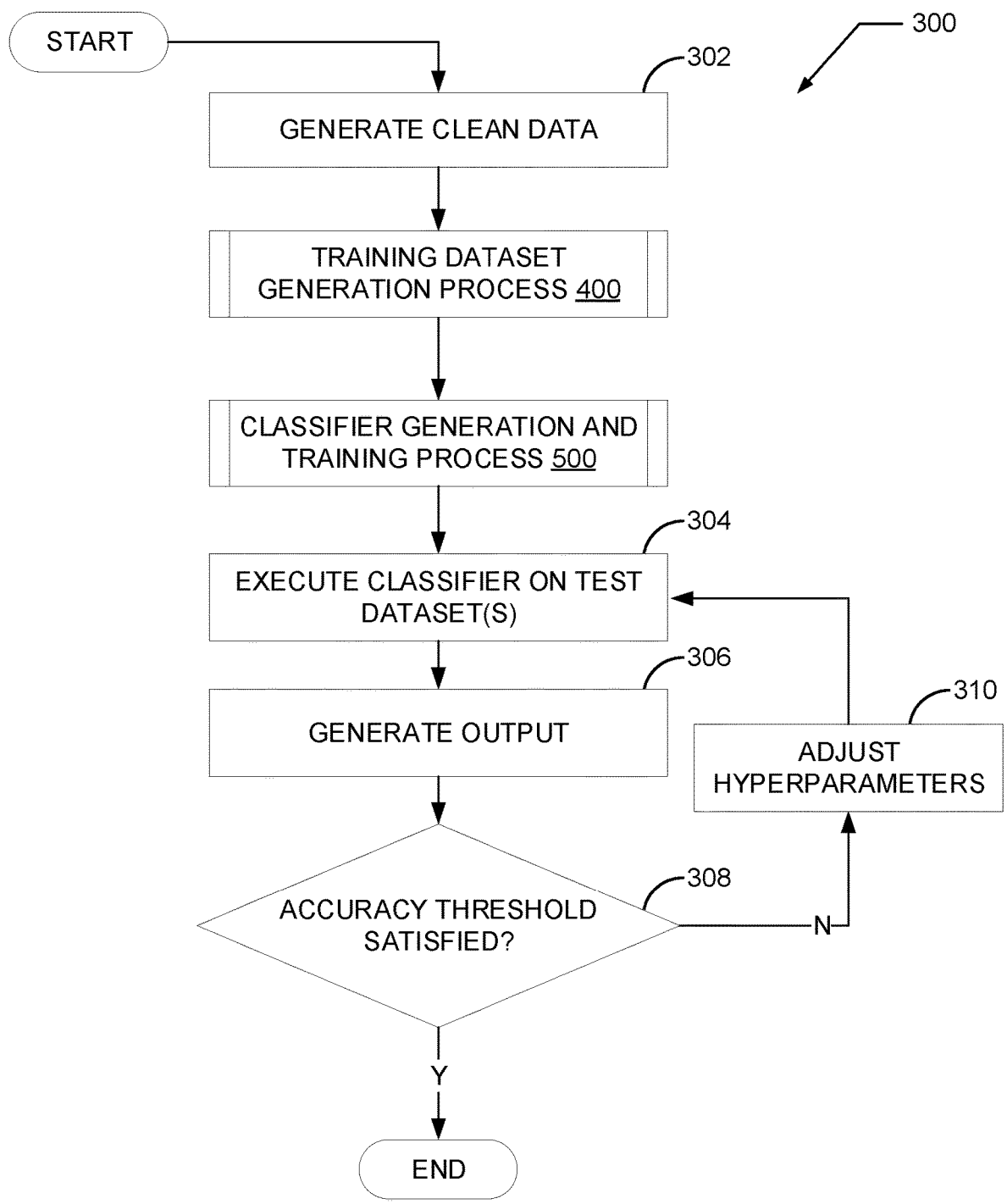
FIG. 3 is a flowchart of an exemplary classification training process according to one embodiment of the present disclosure.

Before turning to the flowcharts of FIGS. 2 and 3, it is noted that embodiments described herein may be practiced using an alternative order of the steps illustrated in FIGS. 2 and 3. That is, the process flows illustrated in FIGS. 2 and 3 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

With reference to FIG. 2, shown is a flowchart of an exemplary machine optimization process 200 according to various embodiments of the present disclosure. In various embodiments, the process 200 is performed repeatedly at predetermined intervals (e.g., hourly, daily, weekly, monthly, and etc.) to account for drifts in conditions (e.g., seasonal conditions, weather conditions, depreciation conditions, etc.) of a machine environment 101 and a particular machine 104 or collection of machines being optimized.

At step 202, raw data 112 associated with a particular machine 104 is received from the data processing system 105, the raw data 112 being associated with a plurality of data sources 120. According to one embodiment, the received raw data 112 is associated with a predetermined historical time interval, such as, for example, 1 week, 1 month, 1 year, etc. In at least one embodiment, the predetermined historical time interval refers to a period of operation of the particular machine 104, such as, for example, 100 hours of runtime, 200 hours of runtime, and etc. In some embodiments, the predetermined historical time interval is determined based on inputs provided to a computing device 107. In one example, the processing system 105 has recorded historical raw data 112 for a time interval of one year, and thus the raw data 112 retrieved at step 202 may include all performance and/or operational data of the particular machine 104 for a period within one year of a current date, or an otherwise specified date.

In one example, in the context of a machine 104 for paper making, the raw data 112 includes speeds for one or more reel sections, a current basis weight (e.g., weight of paper being processed by the machine 104), one or more Yankee cylinder speeds for drying the paper, specific energies of one or more refiners that modify paper fiber to a predetermined degree or that definer pulp, and one or more vacuum pressures provided in various sections of the machine 104 to advance the paper through the various sections.

Following step 202, the optimization system 103 and data processing system 105 execute a classification training and execution process 300 (FIG. 3). The classification training process 300 results in a trained model 118 for classifying datasets as either optimal runtime or pre-error (or, in some embodiments, pre-break). In one embodiment, the classification training process 300 also results in a plurality of importance scores, each importance score being associated with one of a plurality of variables of the trained model 118 and each of the plurality of variables being associated with a particular data source 120.

At step 204, the trained model 118 is executed on a pre-error training dataset to generate output including a plurality of importance scores. According to one embodiment, the trained model 118 outputs a classification of the training dataset as pre-error and the plurality of importance scores. In at least one embodiment, each importance score is associated with one of a plurality of variables of the trained model 118 and each of the plurality of variables is associated with a particular data source 120. In one or more embodiments, the outputting of the importance scores includes performing one or more feature importance processes to compute the importance score of each of the plurality of variables used by the trained model 118.

In one example, the trained model 118 outputs a classification of a dataset as pre-error based on a set of input variables (e.g., data sources 120) from the dataset. In the same example, each input variable's statistical importance in contributing to the pre-error classification is computed using a feature importance technique, such as, for example, determining a value by which each input variable was weighted to generate the classification. According to one embodiment, the importance score of each variable is stored in the data processing system 105 and is associated with the data source 120 corresponding to the variable. In various embodiments, the importance scores provide a metric for assessing a degree to which deviations in values of a particular data source 120 from a set-point are predictive for a pre-break performance state of the machine 104.

For example, a machine 104 for paper making is experiencing error events (e.g., paper breaks) due to tensile stresses building up in the paper that precipitate tears in the paper. In the same example, the trained model 118 analyzes historical pre-error datasets of the paper machine 104 and generates an importance score of each data source 120 therein. Continuing this example, a ranking 122 of the data sources 120 by the importance scores indicates that a top-ranked data source 120 is associated with an internal sensor 106 for measuring vacuum pressure at a particular portion of the paper machine 104. In this same example, the importance score indicates that large increases in the negative vacuum pressure (as recorded by the internal sensor 106) are predictive for a pre-break performance state that may result in the detected paper breaks.

At step 206, a correlation score is generated for each variable of the trained model 118 and is associated with the data source 120 corresponding thereto. In various embodiments, to generate the correlation score, one or more mutual information classification processes are performed to quantify the amount of information obtained about a particular variable (e.g., whether another variable value corresponds with optimal runtime or pre-error data) by observing another variable. In at least one embodiment, mutual information classification quantifies the amount of information obtained about optimal runtime vs. pre-error data by observing values of the variables (e.g., historical readings from the data sources 120 associated with the variables). In one or more embodiments, the system may record the amount of information obtained by observing the value of each X-variable as a correlation value. According to one embodiment, the correlation score of each variable is stored in the data processing system 105 and is associated with the data source 120 corresponding to the variable.

At step 208, a combined score is generated for each variable of the trained model 118, and a ranking of the data sources 120 is generated based on the combined scores of the variables associated therewith. In various embodiments, the combined scores are generated by multiplying, for each variable, the mutual information correlation value by the corresponding importance value. In at least one embodiment, the multiplication results in a combined index of variables, which may be used for ranking and identifying a plurality of data sources 120 to be included in a visualization 126 for monitoring performance of the machine 104 and to be used in a modeling process for generating set-points 124 for the plurality of data sources 120. In various embodiments, the combined index is processed and a ranking 122 of data sources 120 associated with the variables is generated. In one example, each entry of a variable the combined index includes the combined score and an identifier of the data source 120 associated with the variable. In the same example, the combined index is processed to generate a ranking 122 of the data source 120 identifiers in which a top-ranked data source 120 is associated with the variable determined to be most predictive of a pre-error performance state of the machine 104.

It will be understood that the process 200 may be performed to obtain a plurality of data sources 120 associated with variables (generated from readings of the data sources 120) that are determined to be most predictive of an optimal performance state or a pre-error performance state (or other performance state) of the machine 104. In an exemplary scenario in which the machine 104 is a paper making machine, non-limiting examples of variables that may be predictive for a pre-error performance state of the paper making machine include, but are not limited to, reel section speed, current sheet basis moisture level, basic sheet caliper, drying supply temperatures, refiner specific energies, wet strength usage, and other variables.

In at least one embodiment, by controlling types of sensor readings included in a training dataset, the pre-error performance state is refined to a pre-error performance state associated with a particular error event. In one example, the model 118 discussed above is trained to classify a dataset as either optimal runtime or pre-break and, therefore, the model 118 is used to identify a set of data sources 120 that are most predictive of a pre-break performance state of the machine 104. Thus, in one or more embodiments, the process 200 includes performing data preparation, data analysis, and machine learning processes to identify one or more data sources that are most predictive for optimal runtime or pre-break machine performance. In some embodiments, the system may perform only machine learning-based classification methods or only mutual information classifications methods. For example, the system may forego mutual information classification and use only a trained random forest classification model 118 and the importance values generated thereby for the purposes of generating a ranking 122 of most-predictive data sources 120.

At step 210, a plurality of top-ranked data sources 120 are identified using the ranking 122, and the top-ranked data sources are used as inputs in the generation of one or more multivariate models 118 of the machine 104 associated with the trained model 118. In one or more embodiments, a number of top-ranked data sources 120 is limited to a particular quantity, such as, for example, 10, 25, 50, 100, or any other number of data sources as will occur to one of ordinary skill in the art. According to one embodiment, one or more additional data sources 120 are used as inputs to the one or more multivariate models 118. In at least one embodiment, the one or more additional data sources 120 are included based on selections from a user (e.g., received at a computing device 107). In one or more embodiments, a number of the one or more additional data sources 120 is limited to a predetermined quantity, such as, for example, 5, 10, 20, 25, 50, or other quantities.

In at least one embodiment, the multivariate model 118 is generated via principal component analysis (PCA). According to one embodiment, the multivariate model 118 is used for identifying set-point recommendations corresponding with an ideal state of machine performance. Thus, the optimization system 103, having identified a set of most-predictive pre-error (or other) data sources 120 to monitor, creates a multivariate model 118 of an ideal run state for the machine 104. In at least one embodiment, the multivariate model is trained using one or more optimal runtime datasets, the one or more optimal runtime datasets including historical readings from the most-predictive data sources 120 that are determined to correspond to a time interval of optimal performance by the machine 104. The trained multivariate model 118 may be considered "optimal" because the system may train the model using one or more optimal runtime datasets, thereby producing a trained model that reflects machine 104 behavior during an optimal state of operation. Because the trained multivariate model 118 constitutes an optimal operation mode, the system may use the model to determine a set-point 124 (e.g., an optimal value) for each data source 120 included in the trained multivariate model 118. In at least one embodiment, the inputs to the multivariate model 118 include additional data sources 120 that are included based on selections of a user, for example, provided via a computing device 107. In one example, about 25 data sources 120 are selected as inputs via the process 200 and about 25 data sources 120 are selected as inputs based on selections of a subject matter expert in the operation and maintenance of the machine 104. As will be understood and appreciated, however, any number of data sources can be used for a given use case or operational scenario.

In one or more embodiments, the multivariate model 118 is trained using one or more optimal runtime datasets to model machine performance during an optimal state of operation. According to one embodiment, to train the multivariate model 118, multiple optimal runtime datasets are used to account for variances in the historical readings of each data source 120. In various embodiments, the multivariate model 118 is trained by adjusting a number of principal model components (e.g., parameters, variables, metavariables, etc.) that are included and/or utilized by the multivariate model 118.

At step 212, a set-point 124 is generated for each of the top-ranked data sources 120. In at least one embodiment, the trained multivariate model 118 is executed and outputs an optimal value for each data source 120, the optimal value representing a value most consistently demonstrated by the data source 120 during a period of optimal performance by the machine 104 associated therewith. In one or more embodiments, the system generates a table (or other storage structure) including the data sources 120 and the determined set-points 122.

In at least one embodiment, the process 200 is executed for each grade of product processed by the machine 104 and to generate a grade-specific table supporting optimal performance of the machine 104 while processing the corresponding grade of product. In one example, the process 200 is executed in multiple iterations, each iteration associated with a specific paper grade processed by a paper making machine 104. In the same example, each iteration of the process 200 uses datasets associated with a single paper grade. In one or more embodiments, a threshold or set of thresholds or ranges is generated for each set-point 124 that represents boundary conditions for the values of readings from the data source 120 associated with the set-point 124. According to one embodiment, the threshold is generated based on computation of a normal distribution about the set-point 124. In at least one embodiment, pairs of threshold values are determined for a set-point 124, each pair of threshold values representing one standard deviation from the set-point 124 (e.g., or from a previous pair of threshold values). According to one embodiment, the thresholds are stored along with the set-points 124. In at least one embodiment, threshold pairs and set-points associated therewith are used to calibrate an intensity scale 407 (see FIG. 6).

At step 214, the system leverages set-point recommendations and associated information, and generates a real time visualization 126 of machine performance. In one or more embodiments, the real time visualization is based on real time data obtained from data sources associated with respective machines (e.g., actual runtime data being collected in real time as machines operate). In various embodiments, the real time visualization may include an intensity map or heat map, wherein the intensity map may be a graphical representation of current and historical sensor readings that uses a scheme of color coding to indicate and categorize deviations of sensor readings from an associated set-point 124. In at least one embodiment, the visualization 126 displays information regarding a plurality of data sources 120 (e.g., for example, twenty-five data sources from identifier selection inputs and twenty-five data sources from a ranking 122). In one or more embodiments, the data source information displayed on the heat map includes an associated, color-coded indicia and a most recent value of each data source 120 featured, wherein the value may be expressed as a number, as a particular coloration of indicia, or both. In some embodiments, the most recent value may be expressed as a function of deviation from a set point 122, or from a calculated median or average of optimal runtime readings for each of the data sources 120 included in the visualization 126.

In various embodiments, an intensity map represents a time-series visualization for tracking the deviation of multiple data sources 120 (y-axis) from the optimal runtime values across time intervals (X-axis), including a current time interval. In at least one embodiment, a magnitude of time intervals in the X-axis may be assigned by a user of the system or may be automatically determined based on data sampling rates. In one or more embodiments, the scheme of color coding represents deviation from an optimal runtime median value (e.g., calculated by the system), or deviation from a recommended set-point (e.g., as produced by a multivariate model). In at least one embodiment, the scheme of color coding may be configured in a manner such that, for each data source, deviations (e.g., of a sampled data value) from a recommended set-point or from a median value are expressed by a change in a color indicator associated with a data source and included in the heat map. In one or more embodiments, the system may utilize a color spectrum (e.g., when assigning colors to color indicators) to indicate deviation of a sampled data value from a recommended set-point or median value.

In various embodiments, a visualization 126 is generated that displays a metric for overall health of the machine 104. In one or more embodiments, the optimization system 103 calculates overall machine health by summing a total deviation from set-points 124 or median values for all data sources 120 within the multivariate model 118 and scaling the result (e.g., an overall health metric) to fall between 0 and 1. In at least one embodiment, the overall health metric is scaled by, determining and analyzing a distribution of summed deviation from median over historical optimal runtime intervals, identifying an upper confidence limit, such as a $95^{th}$ percentile value, in the distribution, and dividing the deviation from median summation by the upper confidence limit. In various embodiments, the overall health metric is scaled in a manner such that, when the scaled overall health metric approaches a value of 1, the value represents a high degree of overall deviation from optimal machine performance.

At step 216, readings of the data sources 120 are monitored for deviations from the set-points 124. For example, readings of external sensors 102 and internal sensors 106 are iteratively collected at a predetermined frequency and compared to set-points 124 associated therewith. In various embodiments, a critical deviation of a sampled reading value from a set-point 124 or median value is determined when a reading demonstrates a value beyond a predetermined threshold. In one or more embodiments, upon detecting deviation, one or more actions are performed, including, but not limited to, generating alerts, determining one or more corrective actions, and other actions. Alerts may include, but are not limited to, auditory alerts, electronic alerts, which may be transmitted to one or more system elements and operators, and visual alerts that may be rendered on a display 117. In at least one embodiment, the system may include, in the one or more alerts, one or more corrective actions that would be performed by a paper machine operator (whether human or otherwise) in response to a deviation of a machine 104 from an optimal performance state (e.g., as indicated by the deviation). Thus, the corrective actions may include information providing actions that may return a machine 104 to a state of optimal performance. The corrective actions may include, but are not limited to, automatically updating system operating conditions by providing command instructions or signals to machine operating systems.

In one example, in the context of an industrial paper making machine, the system 100 determines that current readings from a moisture sensor in a dry end of the paper making machine exceed a predetermined deviation threshold (e.g., current moisture levels of paper product at the dry end significantly deviate from a set-point moisture level). The dry end refers to a portion of the paper making machine where paper moisture is removed by evaporation via dryer sections and/or air dryers. The elevated moisture levels may cause stress concentrations in the paper to form into tears, precipitating a paper break that would causes the paper making machine to go offline, thereby undesirably reducing productivity. In the same example, in response to detecting the deviation, the system 100 retrieves historical performance data of the paper making machine, identifies one or more time periods therein in which the historical readings of the moisture temperature significantly deviated from the set-point, and retrieves remedial data associated with the one or more time periods. Continuing this example, the remedial data indicates that corrective actions were taken to return the moisture readings to levels within the predetermined threshold. In the same example, the corrective actions include increasing a fan speed of the air dryers at the dry end to increase a rate of evaporation in the paper and decreasing a reel speed such that the paper is processed at the dry end for a longer time period, thereby allowing for increased evaporation.

According to one embodiment, the system continuously compute overall health metric of the machine 104 and monitors for deviations from an optimal overall health metric. In at least one embodiment, the overall health metric is a sum of deviations (scaled between 0.0-1.0) of the current readings of each data source 120 included in an optimal multivariate model 118 of the machine 104. In one or more embodiments, the optimal health metric is 0.0, thereby indicating no deviation from optimal performance conditions. In various embodiments, the system may record data associated with one or more deviations of the overall health metric. In one or more embodiments, in response to detecting a deviation from an overall health metric, the optimization system 103 collects readings associated with a time interval immediately preceding (and, in some embodiments, including) the deviation. In at least one embodiment, the collected readings are used to determine one or more data sources 120 most predictive for the deviation. Thus, the system may leverage recorded deviation data, variable selection processes, and various models 118 to provide one or more data sources 120 that may be predictive for overall machine health. In at least one embodiment, the optimization system 103 may automatically and continuously monitor the one or more associated data sources 120 and produce one or more alerts, upon detecting (e.g., at a future point in time) deviations in the values of readings associated with the one or more data sources 120. In some embodiments, the system may display, on a visualization 126, colored indicia and/or a colored label for each of the one or more data sources 120 identified to be predictive for overall machine health. [A1]

At step 218, the optimization system 103 performs one or more actions upon determining that a deviation of readings from a predictive data source 120 or of the overall health metric exceeds a predetermined threshold. In one or more embodiments, upon detecting the deviation, the optimization system 103 performs one or more actions including, but not limited to, generating and transmitting one or more alerts to one or more computing devices 107, executing emergency corrective and/or shutdown procedures for the machine 104, and other actions. The emergency corrective and/or shutdown procedures may be predetermined operating protocols stored by the data processing system 105 and associated with the particular machine 104 presenting the critically-deviating overall health metric. In one embodiment, the emergency corrective and/or shutdown procedures are performed manually by one or more users and/or automatically by automated control systems connected to the machine 104 and the optimization system 103. In one example, in response to determining that a paper making machine 104 demonstrates a threshold-violating deviation in overall machine health, the system 101 automatically transmits a command to the machine 104, or a control system operating the same, that causes the machine 104 to executed a controlled shutdown process.

With reference to FIG. 3, shown is an exemplary classification training process 300, according to one embodiment of the present system.

At step 302, the system 100 generates clean data 114 by removing various data subsets from received raw data 112. In one or more embodiments, the raw data 112 is associated with a particular sampling rate, which may be a rate at which the raw data 112 was originally collected or a rate at which the raw data 112 is evaluated (e.g., based on timestamps associated with the raw data 112). The sampling rate may be specified automatically or through receipt of a user input. For example, in one embodiment, the system may sample the data at a rate of about 0.01667 Hz (e.g., about one sample per minute). The present disclosure contemplates the use of any suitable sampling rate and places no limitations on the sampling rate other than those which may be required to accurately capture, in the sampled data, machine performance states. According to one embodiment, the raw data 112 is processed at the optimization system 103 to convert the raw data 112 into clean data 114, for example, by removing irregularities and filling gaps in the raw data 112. In one or more embodiments, each row of the raw data 112 corresponds to all data associated with a plurality of data sources 120 at a particular timestamp at which the raw data 112 was received or sampled from the plurality of data sources 120. In at least one embodiment, each column of the raw data 112 corresponds to all time series data available for a particular data source 120. In at least one embodiment, the optimization system 103 identifies each of the one or more data sources 120 associated with the raw data 114 by including a corresponding data source identifier in an appropriate column of the raw data 114.

According to one embodiment, the model engine 108 requests and receives the raw data 112 from the data processing system 105. In one example, the raw data 112 includes time-series values of readings from data sources 120 including, but not limited to, reel section speed, current basis weight, current basis moisture level, basic sheet caliper, TAD supply temperatures, Yankee speeds, specific energies of one or more refiners, vacuum pressures of one or more transfer boxes and/or dewatering boxes, one or more cooling tower return temperatures.

In at least one embodiment, processes performed to convert raw data 112 to clean data 114 may be referred to as data "cleaning." In various embodiments, the present optimization system 103 may perform one or more steps of a data cleaning process automatically, manually, or in a combination of both. In various embodiments, data cleaning includes, but is not limited to: 1) removing rows with too many missing values; 2) removing columns with too many missing values; 3) removing columns corresponding to sources of the one or more data sources, which output categorical data; 4) removing columns containing values which are highly statistically correlated (e.g., as determined by the system); and 5) removing columns containing values that, collectively, present high and/or low coefficient of variance (e.g., as determined by the system).

In various embodiments, the optimization system 103 removes rows of the raw data 112 that do not meet a minimum predetermined threshold of data density (e.g., there are too many missing data values). In at least one embodiment, insufficient row data density may represent a period of downtime for a corresponding machine (e.g., a machine 104 associated with the data). In one or more embodiments, the optimization system 103 then removes columns of the raw data 112 that do not meet a minimum threshold of data density. In at least one embodiment, causes for insufficient column data density may include, but are not limited to, data sources 120 that have gone offline, new data sources 120 lacking sufficient historical data, and data sources 120 with a low sampling rate within the data processing system 105.

In various embodiments, the optimization system 103 then removes categorical columns and associated categorical data from the raw data 112. Per the present disclosure, "categorical" generally refers to a discontinuous quality of data, wherein the data may take on one of a limited, and usually fixed number of possible values. For example, a categorical data source removed by the optimization system 103 could be a paper color identifier, wherein the associated categorical data could be colors (e.g. "red", "blue", "pink", etc.), which are of a discontinuous quality (e.g., and thus are not suitable for numerically-based analyses). In one or more embodiments, following removal of categorical columns and data, the optimization system 103 removes columns from the raw data 112 containing data that is highly statistically correlated to data of other columns. In at least one embodiment, the optimization system 103 may compare, in a pairwise manner, values of all columns for a measure of correlation. In one or more embodiments, columns having high correlation may include overlapping information and, thus, may be redundant. In various embodiments, when two columns present data with a high correlation, one of the columns (e.g., and associated data) may be retained at random, unless a user of the optimization system 103 specifies one of the columns to be retained.

In one or more embodiments, the optimization system 103 then removes columns and associated data from the raw data 112 that present a high or low coefficient of variance. Per the present disclosure, a coefficient of variance represents the volatility of readings associated with a data source 120. In at least one embodiment, a high coefficient of variance may introduce an unacceptable level of noise to a set of raw data 112, and a low coefficient of variance may present an insufficient level of data variance with which to leverage in a data analytics application. In one example, readings from a particular data source 120, an internal sensor 106 for measuring vibration levels, demonstrates large fluctuations in value over randomly distributed time periods, thereby resulting in a high coefficient of variance being determined for the data source 120. In the same example, the particular data source 120 is determined to be prohibitively volatile and is removed from the raw data 112 (e.g., by removing the column corresponding to the particular data source 120).

According to one embodiment, the process 300 includes performing a training dataset generation process 400 (see FIG. 4) to process the clean data 114 into training data 116 and to organize the training data 116 into one or more training datasets used in the training of one or more models 118.

In at least one embodiment, following generation of one or more training datasets, the process 300 includes performing classifier model generation and training process 500 to provide a trained classifier model 118 for classifying datasets as either optimal runtime or pre-error.

At step 304, the trained classifier model 118 is executed on a test dataset. According to one embodiment, training data 116 of the test dataset excludes training data 116 that was included in the one or more training datasets used at step 306. According to one embodiment, the classification of the test dataset is known to the optimization system 103, but is not known to the trained classifier model 118. In at least one embodiment, the test dataset includes one or more optimal runtime datasets generated at step 304 and, thus, the classification thereof is optimal runtime. According to one embodiment, a test dataset is a subset of a training dataset that is not used for training a classifier model 118 (e.g., fitting the classifier model 118 to a dataset that includes inputs and known classification outputs). In one or more embodiments, the test dataset is used for validating the trained classifier model, the test dataset including inputs but excluding known classification outputs (e.g., the known classification outputs being used to evaluate accuracy of the trained classifier model 118.

In various embodiments, the classifier model 118 is configured to perform feature importance analysis of the variables and compute an importance score associated with each variable, according to the variable's statistical importance in contributing to the classification (e.g., by the trained classifier) of a set of data as either optimal runtime or pre-break. In one or more embodiments, the classifier model 118 outputs an importance value for each input variable, and the data processing system 105 records the importance value and information indicating with which variable and data source 120 the importance value is associated.

At step 306, the trained classifier model 118 generates an output. In one or more embodiments, the output includes a classification of the test dataset as pre-error or optimal runtime. In various embodiments, steps 304 and 306 are performed iteratively using test datasets of varying classification. In one example, the steps 304 and 306 are performed using a plurality of optimal runtime-classified test datasets and a plurality of pre-error-classified test datasets to generate an output classification for each test dataset.

At step 308, an accuracy of the trained classifier model 118 is generated and compared to a predetermined accuracy threshold. In one example, the classification of the test dataset generated at step 306 is compared to a known classification of the dataset and, upon determining the classifications match, the predetermined accuracy threshold is satisfied. In another example, the classification of each of a plurality of test datasets are compared to known classifications of each test dataset, and an overall classification accuracy is generated based on a percentage of output classifications that matched a corresponding known classification. In the same example, the overall classification accuracy is compared to a predetermined accuracy threshold and is determined to exceed, and thus satisfy, the predetermined accuracy threshold. According to one embodiment, upon determining that the trained classifier model 118 satisfies the predetermined accuracy threshold, the process 300 ends. In at least one embodiment, upon determining that the trained classifier model 118 does not satisfy the predetermined accuracy threshold, the process 300 proceeds to step 310.

At step 310, the classifier model 118 is tuned by adjusting one or more hyperparameters. In at least one embodiment, the system performs one or more k-fold cross-validations during training of the model 118, wherein results thereof may result in the system reconfiguring one or more hyperparameters of the model 118 including, but not limited to, number of decision trees in a forest, number of variables in a decision tree, maximum number of features (e.g., variables) considered before branching, maximum depth of a decision tree, and other hyperparameters. Per the present disclosure, k-fold cross-validation refers to a procedure used to assess the performance of a classifier on data (e.g., new data). No limitation is placed on the number of k-fold cross validations that may be performed on one or more random forest classifiers.

According to one embodiment, following adjustment of the one or more hyperparameters, the process 300 proceeds to step 304 and the trained classifier model 118 is re-evaluated for accuracy in classifying one or more test datasets as pre-break or optimal runtime.

Figure 4:
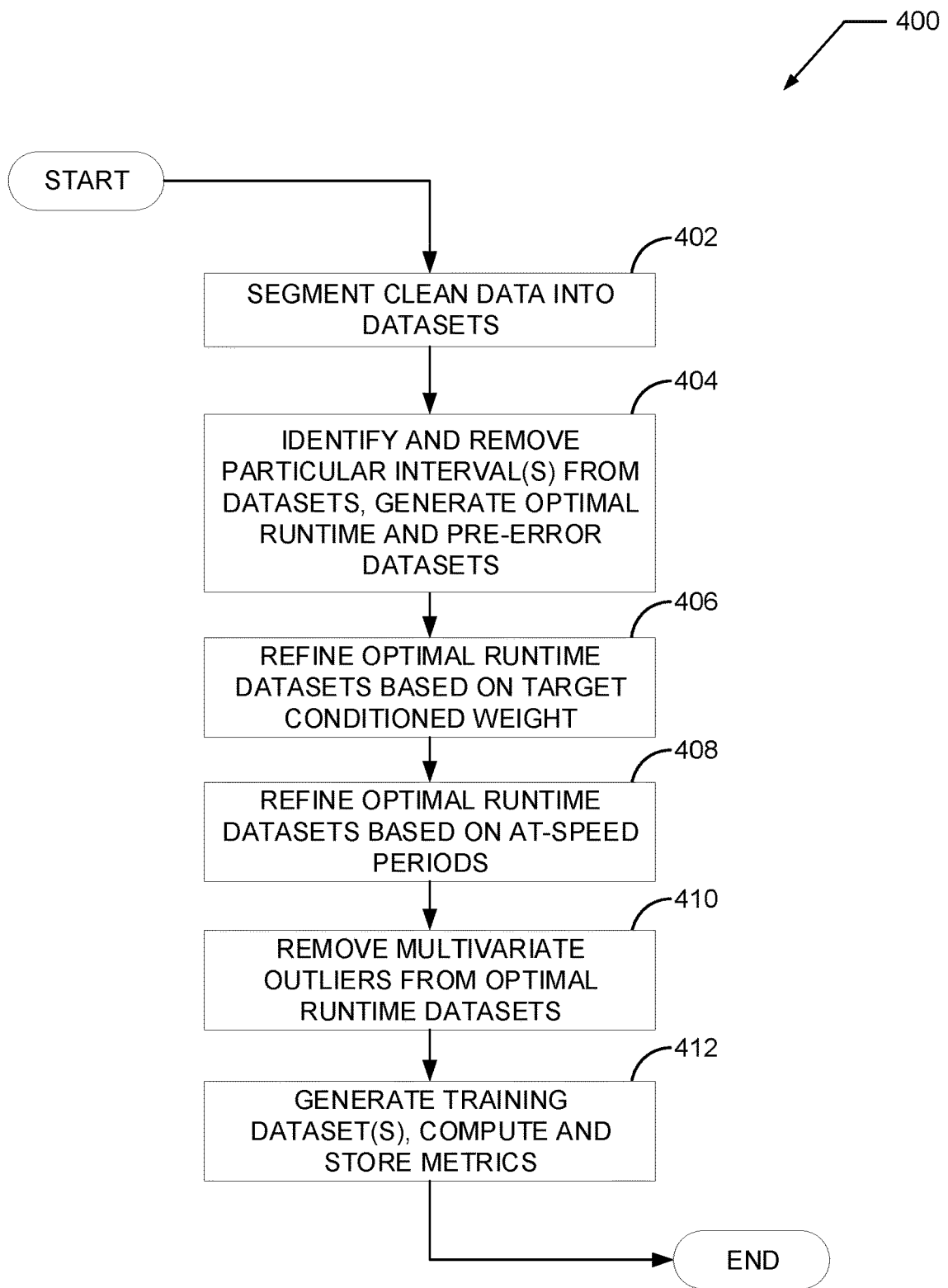
FIG. 4 is a flowchart of an exemplary data cleaning process according to one embodiment of the present disclosure.

Referring now to FIG. 4, shown is a training dataset generation process 400 according to one embodiment of the present system. According to one embodiment, the process 400 generates one or more training datasets from the clean data 114. In one or more embodiments, the training datasets include training data 116 that is generated by extracting various portions of the clean data 114 to obtain data associated with one or more optimal runtime intervals and data associated with one or more pre-error intervals. In at least one embodiment, a training dataset output from the process 400 includes one or more optimal runtime datasets and one or more pre-error datasets.

At step 402, the clean data 114 is segmented into a plurality of datasets based on a grade or type of product with which portions of the clean data 114 are associated. For example, the clean data 114 is segmented into a dataset based on a grade of paper associated with portions of the clean data 1114. In at least one embodiment, the optimization system 103 splits the cleaned data 114 into one or more secondary clean datasets, wherein the one or more secondary cleaned datasets each include data associated with a different grade or type of product processed by the machine 104.

At step 404, a plurality of intervals are identified in the plurality of datasets and data within the plurality of intervals is removed for the purposes of generating one or more optimal runtime datasets and one or more pre-error datasets. In various embodiments, the optimization system 103 generates an optimal runtime dataset by removing data from the cleaned data 114 that is not associated with an interval of optimal runtime. In one or more embodiments, the optimization system 103 may identify, in each of the datasets a plurality of intervals of varying type. In at least one embodiment, the optimization system 103 identifies one or more error event intervals, wherein the one or more error intervals include periods of time during which an error event occurred on the machine 104 (e.g., such as a paper break). According to one embodiment, the optimization system 103 identifies one or more pre-error intervals, wherein the one or more pre-error intervals include periods of time immediately preceding an error event. In one or more embodiments, the optimization system 103 identifies one or more post-error intervals, wherein the one or more post-break intervals includes periods of time immediately following error events (e.g., or error event intervals).

In various embodiments, the optimization system 103 removes, from each of the one or more secondary cleaned datasets, data occurring within the one or more error event intervals periods, the one or more pre-error intervals and the one or more post-error intervals, thereby creating one or more optimal runtime datasets from the remaining clean data 114. In at least one embodiment, one or more pre-error datasets are generated by retrieving the clean data 114 corresponding to the one or more pre-error intervals and organizing the retrieved clean data 114 into one or more pre-error datasets based on a grade or type of product associated with subsets of the clean data 114. In at least one embodiment, the optimization system 103 recognizes and ignores pre-error intervals that preceded an error event that was caused by factors or events unrelated to performance of the machine 104. For example, the optimization system 103 may ignore a pre-error interval in which the subsequent error event, a paper break, occurred due to presence of a foreign substance or object on a paper medium or a paper making machine 104.

According to one embodiment, following step 404, the datasets of step 402 are converted into a plurality of optimal runtime datasets and a plurality of pre-error datasets.

At step 406, the plurality of optimal runtime datasets are further refined based on identifications of target time periods within the datasets in which the associated machine 104 performed within a target conditioned weight. In various embodiments, the optimization system 103 further refines the one or more optimal runtime datasets. In one or more embodiments, the optimization system 103 identifies one or more target time periods within time intervals of each of the one or more optimal runtime datasets during which the machine 104 performed within a certain percentage of a target conditioned weight stored in the data processing system 105. According to one embodiment, the performance of the machine 104 is evaluated by comparing values of readings associated with one or more data sources 120 of the machine 104 to predetermined target conditioned weights. In one example, the one or more target time periods correspond to time intervals during which an internal sensor 106 for recording product output rate reported readings satisfying a target condition weight for output rate.

In at least one embodiment, a value of the target conditioned weight is different for each grade or type of product, thus the optimization system 103 selects the proper value of the target condition weight based on the grade or type of product associated with each of the one or more optimal runtime datasets. In various embodiments, the optimization system 103 removes, from each of the one or more optimal runtime datasets, data falling outside of the one or more target time periods. In one or more embodiments, wherein the optimization system 103 removes data from a dataset, the optimization system 103 may remove all data at a given timestamp (e.g., the optimization system 103 may remove entire rows from a dataset representing values for all data sources 120 at the timestamps corresponding to the rows).

At step 408, the plurality of optimal runtime datasets are further refined based on identifications of at-speed time periods in which the associated machine 104 performed at or in excess of a minimum optimal speed. In various embodiments, the optimization system 103 identifies one or more optimal speed time periods (also referred to as "at-speed" time periods) within each of the one or more optimal runtime datasets, the one or more at-speed time periods representing time intervals during which the machine 104 performed at a minimum optimal speed. In at least one embodiment, a value of the minimum optimal speed may be different for each grade or type of product, thus the optimization system 103 selects the proper value of the minimum speed based on the grade or type of product associated with each of the one or more optimal runtime datasets. In one or more embodiments, the optimization system 103 removes, from each of the one or more optimal runtime datasets, data falling outside of the one or more at-speed time periods.

In at least one embodiment, the optimization system 103 may determine the value of the minimum optimal speed of a given machine 104, wherein speed may refer to an input rate, an output rate, or a combination thereof, of the machine 104. In one or more embodiments, to determine the value of the minimum optimal speed, the optimization system 103, develops a historical distribution of speeds attainable by a machine 104 (e.g., based on collected data), calculates a $50^{th}$ percentile of the historical distribution and determines the $50^{th}$ percentile as the minimum speed for the machine 104 (e.g., for the purposes of refining the one or more optimal runtime datasets). In various embodiments, the optimization system 103 may determine the minimum optimal speed by automatically or manually (e.g., in response to an input) collecting a set of operating parameters associated with the given machine 104 (e.g., wherein the set of operating parameters may be retrieved from the data historian 113) and parsing the minimum speed from the set of operating parameters. In one or more embodiments, the optimization system 103 may determine the minimum optimal speed by processing an input from a user. In some embodiments, because of the influence of environment, workload and depreciation on the given machine, the optimization system 103 may iteratively determine the minimum optimal speed. For example, one or more components of the given machine may experience greater failure rates (e.g., and, thus, more paper breaks) during colder seasons, thus the optimization system 103 may determine the minimum speed to be lower during colder seasons to compensate for the increase in component failure rates (e.g., and attempt to reduce the frequency of component failures). In at least one embodiment, to account for such drifts and shifts in machine performance, the optimization system 103 inspects current readings of one or more external sensors 102, such as, for example, weather-related sensors 106, and accordingly adjusts the determined minimum optimal speed. According to one embodiment, the minimum optimal speed is adjusted based on factors such as an uptime and/or downtime of the machine 104, a depreciation level of the machine 104, and other factors.

At step 410, the plurality of optimal runtime datasets are further refined by identifying and removing one or more multivariate outliers from each of the plurality of optimal runtime datasets. In various embodiments, the optimization system 103 removes multivariate outliers from each of the one or more optimal runtime datasets. In one or more embodiments, the optimization system 103 may remove multivariate outliers by determining multivariate similarity of rows within each of the one or more optimal runtime datasets and removing rows of data from the respective dataset, which are found to be highly dissimilar to the bulk of the data (e.g., as indicated by the multivariate similarity of each row). In at least one embodiment, the optimization system 103 may leverage Mahalanobis distances to calculate multivariate similarity. Per the present disclosure, a Mahalanobis distance refers to a measure of the distance between a point and a distribution.

At step 412, one or more training datasets are generated, for example, by organizing the plurality of optimal runtime datasets of step 410 and, in some embodiments, the plurality of pre-error datasets of step 404 into the one or more training datasets. In one or more embodiments, a training dataset includes a subset of the plurality of optimal runtime datasets and a subset of the plurality of pre-error datasets. In at least one embodiment, one or more test datasets are generated that each include, but are not limited to, a second subset of the plurality of optimal runtime datasets that excludes the first subset thereof and a second subset of the plurality of pre-error datasets that excludes the first subset thereof. In some embodiments, the plurality of optimal runtime datasets and the plurality of pre-error datasets are stored by the data processing system 105 as training data 116, along with identifiers corresponding to the data sources 120 associated with the each dataset.

In at least one embodiment, step 412 includes computing and storing one or more metrics from the one or more training datasets (e.g., from the plurality of optimal runtime datasets and/or the plurality of pre-error datasets included therein). In various embodiments, the system 100 calculates, from the optimal runtime datasets of the one or more training datasets, a median value and a standard deviation associated with each data source 120 for each grade or type of product processed by the machine 104. In one or more embodiments, the median value and standard deviation are stored by the data processing system 105 and are used to compute various metrics, such as, for example, overall machine health metrics.

Figure 5:
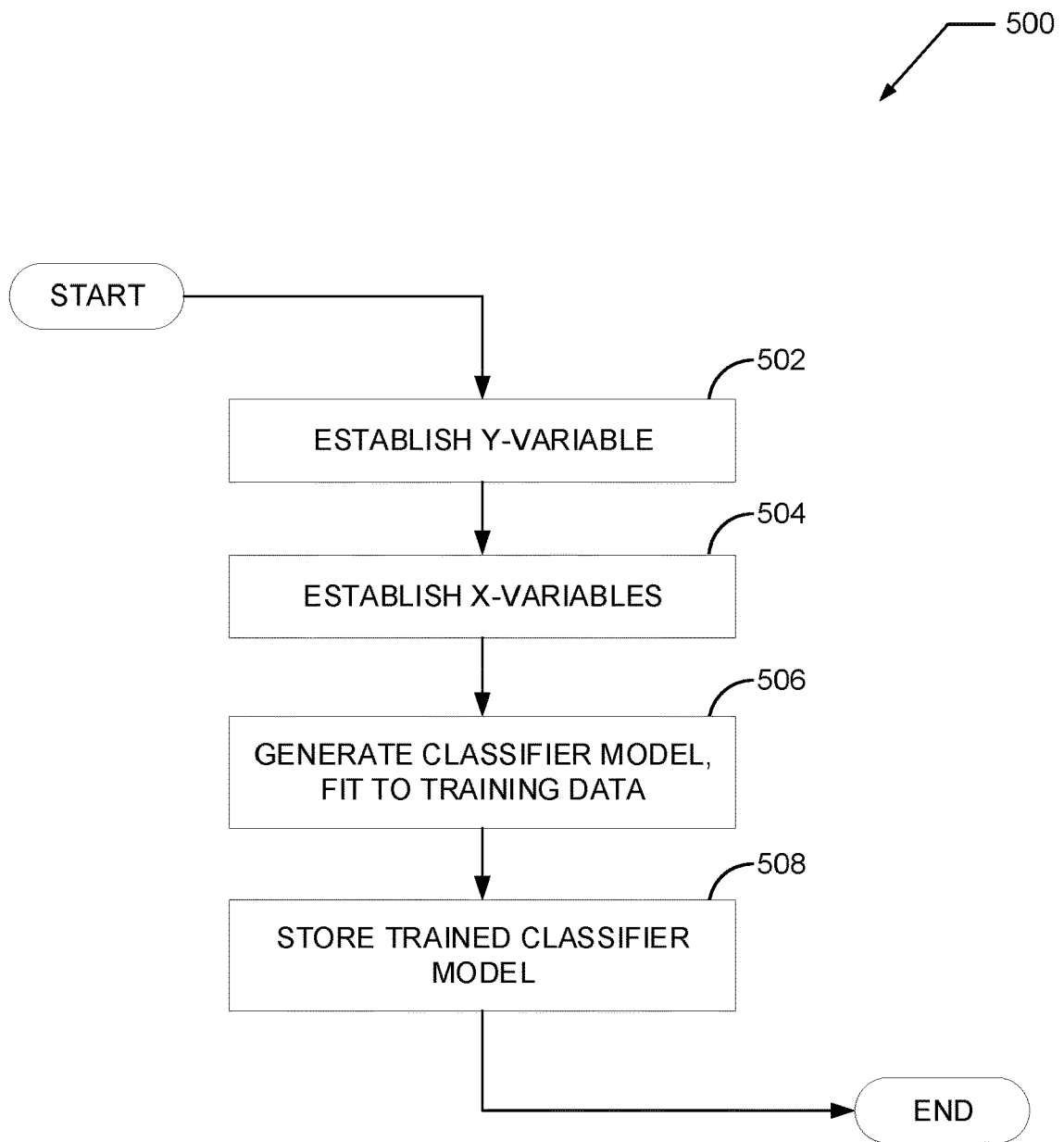
FIG. 5 is a flowchart of an exemplary classifier model generation and training process according to one embodiment of the present disclosure.

Referring to FIG. 5, shown is an exemplary process 500 for generating and training a classifier model according to one embodiment of the present system. In one or more embodiments, the process 500 includes performing an ensemble machine learning method (such as random forest classification) to create and train a classifier model 118. In various embodiments, the system 100 leverages random forest classification and feature importance methods to produce a classifier that automatically classifies datasets as either optimal runtime datasets or pre-error datasets; and 2) outputs an importance score of each variable (e.g., each data source 120 or metric derived therefrom) in determining whether a dataset is of an optimal runtime or pre-error quality. Thus, the system may train the classifier using known optimal runtime and known pre-error datasets, so that the classifier may later accept, as an input, an unclassified dataset, classify the dataset as optimal runtime or pre-error, and determine which data sources of the then-classified dataset were most important to the classification action.

At step 502, a Y-variable is established. In one or more embodiments, the optimization system 103 creates a categorical pre-error Y-variable represented as a discrete value (e.g., 1.0), wherein the pre-error variable is associated with a pre-error time interval (e.g., a period of time leading up to an error event, such as a paper break). In at least one embodiment, the discrete value of the pre-error Y-variable may be dependent on a speed of an associated machine. In one or more embodiments, the pre-error Y-variable represents a classification of a dataset as pre-error. In one example, upon execution of the trained classifier model 118 on a pre-error dataset, an output of 1.0 is generated, thereby indicating a pre-error classification. In an alternate example, upon execution of the trained classifier model 118 on an optimal runtime dataset, an output of 0.0 is generated, thereby indicating an optimal runtime classification.

At step 504, a plurality of X-variables are established. According to one embodiment, generating the classifier model 118 includes establishing a Y-variable and a plurality of X-variables. In at least one embodiment, the plurality of X-variables include the readings from each data source 120 of the training dataset. For example, the plurality of X-variables includes historical readings associated with data sources 120 included in one or more optimal runtime datasets and/or included in one or more pre-error datasets of the training dataset.

In at least one embodiment, the system only proceeds with X-variable selection and model training for optimal runtime datasets in which there is a predetermined duration of time represented by the data of an optimal runtime dataset available. According to one embodiment, the predetermined time duration can be any time relevant to the particular application, such as 100 hours of machine 104 uptime, about 1000 hours of machine 104 uptime, or any other duration. In one or more embodiments, the system conducts X-variable selection and model building activities on only the most recent selected time period (e.g., 100 hours) of optimal runtime data available in each of the one or more optimal runtime datasets. In at least one embodiment, a purpose of limiting X-variable selection and model building activities to the most recent 100 hours may be to account for changes in machine performance caused by fluctuations in weather, feedstock and process drift (e.g., natural changes through equipment depreciation and operator techniques). That said, the present disclosure contemplates embodiments, wherein the system proceeds with variable selection and model building for optimal runtime datasets for which there is any amount of optimal runtime data available (e.g., the system may be agnostic of temporal range of data). The present disclosure further contemplates embodiments, wherein the system automatically or manually assigns a minimum time threshold and, thus, only proceeds with variable selection and model building for optimal runtime datasets including optimal runtime data satisfying the minimum time threshold. For example, if the system assigns a minimum time threshold of 168 most-recent hours (e.g., one week), the system will only proceed with variable selection and model building for optimal runtime datasets in which there are at least 168 hours of optimal runtime data available.

In various embodiments, the optimization system 103 generates additional X-variables by computing various metrics from each of the one or more optimal runtime datasets. In one or more embodiments, the system calculates a moving range for each of the one or more X-variables determined from the one or more optimal runtime datasets. In other words, the system calculates a moving range and a rolling average from data associated with each of the one or more data sources (i.e., the one or more X-variables) included in the variable selection process. In at least one embodiment, the associated data, moving range and rolling average of each of the one or more X-variables are used as additional X-variables of the classifier model 118.

At step 506, classifier model 118 is generated using the Y-variable and X-variables, and is trained using training data 116 (e.g., organized into one or more training datasets via the process 400). According to one embodiment, generating the classifier model 118 includes constructing a multitude of decisions trees that each randomly combine a subset of the X-variables to generate a prediction including a classification of a dataset associated with the X-variables as being optimal runtime or pre-error. In one or more embodiments, the mode of the individual tree predictions is computed and is reported as a final output classification of the dataset. In various embodiments, the training data 116 to which the classifier model 118 is fitted includes known classifications of each dataset therein or, in other words, known Y-variables of each dataset. Thus, in one or more embodiments, fitting the classifier model 118 to the training data 116 includes identifying combinations of the X-variables such that predictions generated for each training dataset matches the known Y-variable that is associated with the training dataset. In one or more embodiments, using one or more optimal runtime datasets and one or more pre-error datasets, the classifier model 118 is trained to accurately differentiate between optimal runtime datasets and pre-break datasets. In one example, the classifier model 118 is fitted to a first training dataset to generate a first iteration of a trained classifier model 118. In the same example, the classifier model 118 is refitted to a second training dataset (e.g., including at least a subset of training data 116 that is distinct from training data 116 of the first training dataset) to generate a second iteration of the trained classifier model 118. According to one embodiment, approximately 80% of training data 116 in a training dataset is used for model training and the approximately 20% of remaining training data 116 is used to generate test datasets for assessing performance (e.g., accuracy) of the trained classifier model 118. Of course, as will occur to one of ordinary skill in the art, virtually any percentage of training data 116 can be used for training or assessing performance of a model 118. In various embodiments, an output of step 506 includes one or more trained classifier models 118. In one or more embodiments, the output includes a trained classifier model 118 is generated and trained (via fitting) for each grade or type of product associated with the training data 116 of the machine 104 being optimized.

At step 508, the one or more trained classifier models 118 are stored by the data processing system 105. In at least one embodiment, the stored models 118 are retrieved and retrained (via the aforementioned steps) using new training data 116 that is generated on a regular, repeating basis to account for changes in the machine 104 in response to various factors such as weather, depreciation, maintenance and cleaning, and other factors. According to one embodiment, the period and regular retraining of the models 118 provides for more accurate and more precise predictions as the retrained models 118 may be more precisely attuned to a current condition of the machine 104.

Figure 6:
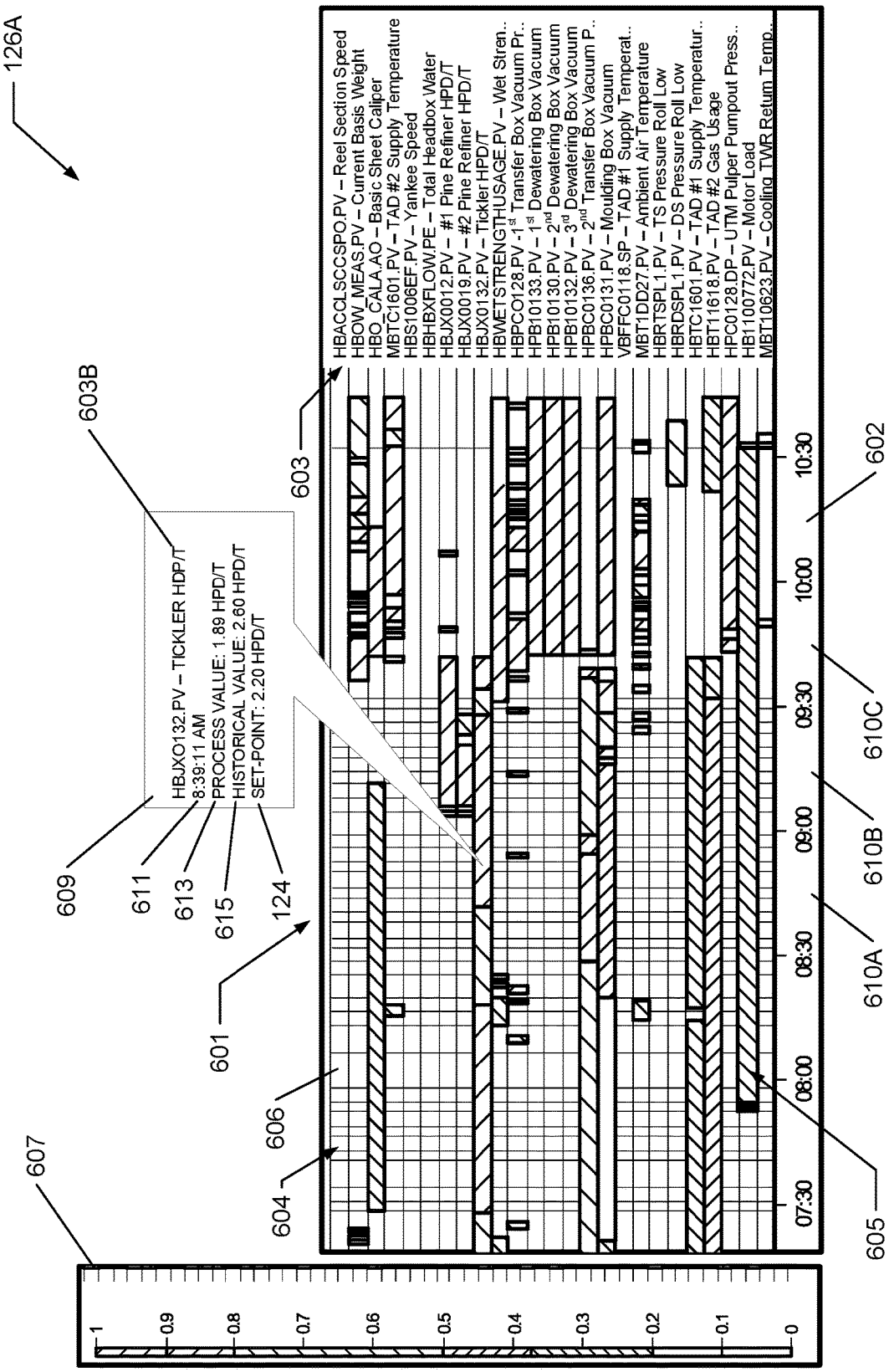
FIG. 6 is a representation of a user interface illustrating an exemplary heat map or intensity map of a machine state according to one embodiment of the present disclosure.

Referring to FIG. 6, shown is an exemplary visualization 126A displaying various details regarding current and previous performance states of a machine 104. According to one embodiment, the visualization 126A includes an intensity map 601 relating current values of data sources 120 to set-points 124 generated from one or more processes described herein.

In at least one embodiment, the intensity map 601 includes a plurality of labels 603 organized into a Y-axis. Each of the plurality of labels 603 uniquely identifies a particular data source 120 (or metric derived therefrom) that is represented in the intensity map 601. According to one embodiment, the intensity map 601 includes a plurality of labels 603 associated with data sources 120 determined to be predictive for particular machine states according to processes described herein, and the intensity map includes a second plurality of labels 603 associated with data sources 120 that were selected by a user via selections provided to a computing device 107.

In some embodiments, a label 603 is generated based on an identifier of the associated data source 120. In at least one embodiment, a label 603 is generated based on a particular condition or phenomena recorded in readings associated with the data source 120. Non-limiting examples of conditions or phenomena recorded by the data sources 120 and represented by the labels 603 include, but are not limited to, reel section speed, current basis weight, current basis moisture level, basic sheet caliper, one or more through-air drying (TAD) supply temperatures, Yankee speed (e.g., rotational speed of one or more cylinders of a Yankee drying machine), total headbox water, one or more pine refiner specific energies (where specific energy is measured as total horsepower days per ton (HPD/T)), one or more tickler specific energies, wet strength usage, one or more transfer box vacuum pressures, one or more dewatering box vacuum pressures, one or more moulding box vacuum pressures, ambient air temperature (e.g., in a machine environment 101 in which the machine 104 is located), tending side (TS) pressure, drive side (DS) pressure, one or more TAD gas usage levels, one or more motor loads, one or more cooling tower return temperature, under-the-machine (UTM) pulper pumpout pressure, UTM pulper exhaust rate, blend chest hot water flow, chest level (e.g., chest being a vessel for storing and treating pulp), lubricant flow, and other conditions, phenomena, or metrics or readings derived therefrom.

In one or more embodiments, the intensity map 601 includes a time axis 602 that includes a plurality of time intervals 610A, 610B, 610C. In one example, the plurality of time intervals 610A, 610B, 610C are half-hour periods preceding a current time. In at least one embodiment, the time axis 602 is customizable. In one example, a number and/or time period magnitude of the plurality time intervals 610A, 610B, 610C is selected based on inputs from a computing device 107 on which the visualization 126A is rendered.

In one or more embodiments, for each label 603, the intensity map 601 includes a row 604 including one or more sampling frames 606. According to one embodiment, each sampling frame 606 is rendered with a color or other visual indicator (shown as patterning in FIG. 6) based on a value of the data source 120 associated with the label 603 of the row 604 as compared to an intensity scale 607. According to one embodiment, the intensity scale 607 relates particular wavelengths of color to deviation from a set-point 124 or from a median optimal runtime value. In at least one embodiment, sampling frames of sampled data source 120 values meeting the set-point 124 or optimal median may be colored with colors of longer wavelengths, such as blue, while those progressing through a series of standard deviations away from the determined values may be colored with colors of longer wavelengths, such as red. In one example, maximum deviation in a sampling frame 606 is denoted with a red coloring. In one example, the intensity scale 607 uses a rainbow-based color scheme in which increasing deviation corresponds to changes in color from blue (e.g., corresponding to the set-point value 124) to red, passing through the other colors of the rainbow as the deviations increases towards a magnitude associated with the red color. In one example, an intensity scale 607 ranges in value between 0.0 and 1.0, and each value in the intensity scale 607 represents a level of deviation (e.g., a standard deviation normalized to the 0.0-1.0 scale) from a set-point 124. In various embodiments, the system 100 includes scaled standard deviation thresholds relating scaled standard deviation values to wavelengths of a set of colors (e.g., higher values trending toward longer wavelengths and lower values trending toward shorter wavelengths). According to one embodiment, to determine a coloring of each sampling frame 606, the optimization system 103 performs actions including, but not limited to: 1) computing a normal distribution about the set-point 124 of the data source 120 associated with the sampling frame 606; 2) mapping normalized standard deviations of the normal distribution to colors of an intensity scale 607; 3) computing and normalizing a standard deviation metric between a value sampled from readings (associated with the data source 120) corresponding to the time interval 610 of the sampling frame 606; and 4) determining a color of the sampling frame 606 by comparing the normalized standard deviation metric to the intensity scale 607. As will be understood and appreciated, any color scheme, hashing, patterns, or other visual indicators can be used in connection with the intensity map 601 to demonstrate changes in operational parameters or data as compared to desired or optimal set points.

In one or more embodiments, to simplify and expedite a user's interpretation of the intensity map 601, sets of sampling frames 606 demonstrating significantly similar values are merged into sequences 605. In alternate embodiments, the intensity map 601 excludes sequences 605 and all sampled values are represented via the sampling frames 606.

In at least one embodiment, the visualization 126A is updated in response to user inputs. According to one embodiment, in response to selection of a particular label 603, sampling frame 606, or sequence 605, the visualization 126A is updated to include a window 609 including additional information regarding the data source 120 associated with the selected item. In one or more embodiments, the window 609 includes, but is not limited to, the label 603B associated with the data source 120, a timestamp 611 corresponding to the time at which readings associated with the data source 120 were sampled, a current value 613 of the data source 120, a historical value 615 computed from an average value of the data source 120 computed from one or more optimal runtime datasets, a set-point 124 associated with the data source 120, and other information, such as, for example, remedial data and one or more corrective actions associated with the data source 120. According to one embodiment, upon a data source 120 recording a value beyond a predetermined threshold (e.g., beyond a predetermined deviation from the set-point 124), the optimization system 103 automatically updates the visualization 126A to include a window 109 associated with the deviating data source 120.

In at least one embodiment, via the visualization 126A, the optimization system 103 enables real time visualization of machine performance, wherein the visualization scheme may support a Six Sigma approach to monitoring, correcting and controlling machine performance. In various embodiments, the optimization system 103 indicates that a data source 120 is deviating from historical optimal runtime values by updating the intensity map 601 display. In one example, the update includes adding a sampling frame 106 in a row 604 corresponding to the data source 120 and coloring the sampling frame 106 with a color corresponding to the intensity scale 607 and the determined magnitude of the deviation. In the same example, the sampling frame 106 is colored red, thereby indicating deviation of the data source 105 from an optimal runtime value to a pre-error value. Continuing this example, the visualization 126A is updated to include a window 609 including a recommended set-point 124 and one or more corrective actions that may be performed to potentially return the data source 120 to an optimal runtime value.

Figure 7:
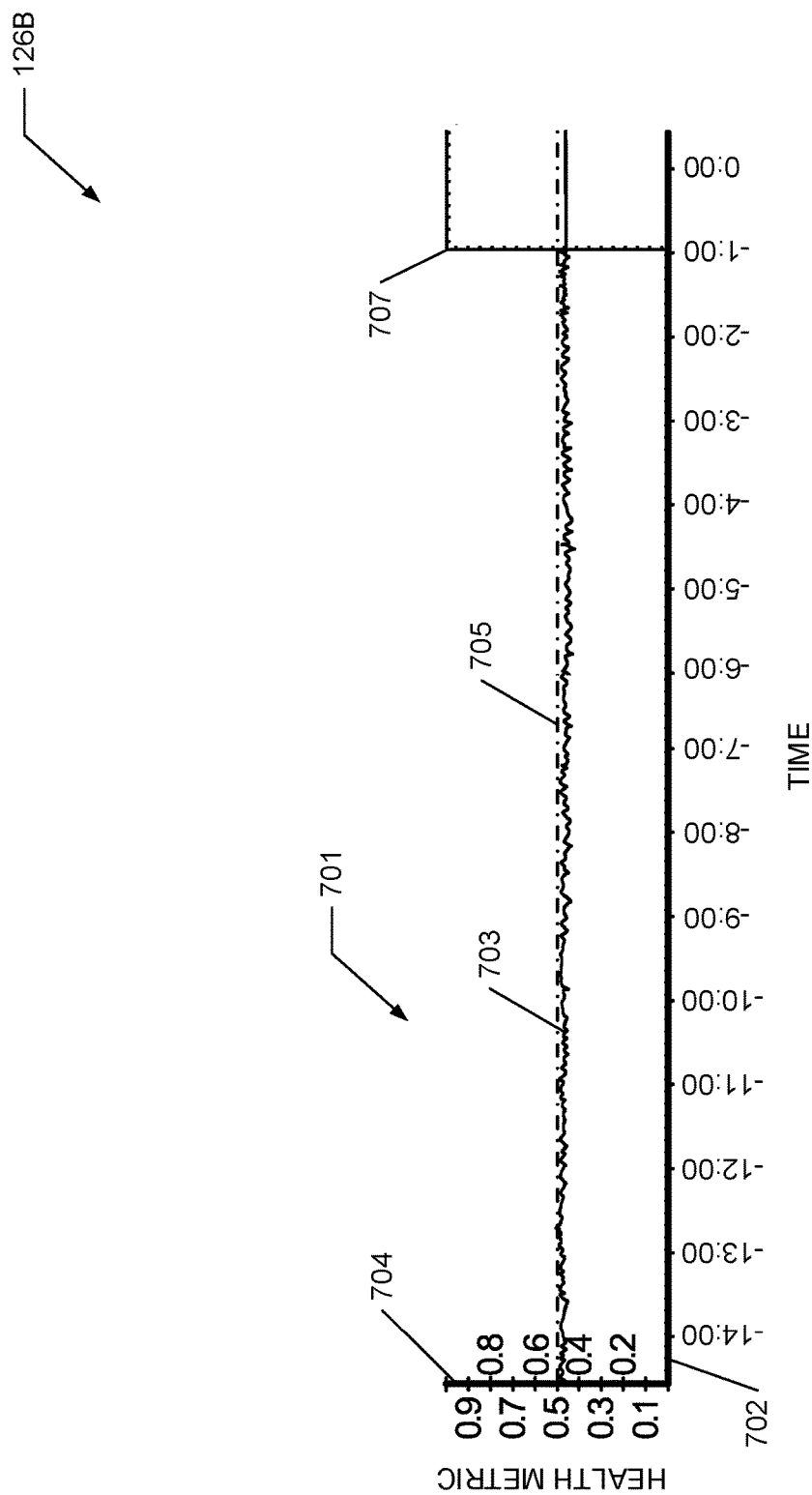
FIG. 7 is a representation of a user interface illustrating an exemplary machine health visualization according to one embodiment of the present disclosure.

With reference to FIG. 7, shown is an exemplary visualization 126B. In at least one embodiment, the visualization 126B includes a machine health chart 701 that provides a real-time visualization of overall health of a machine 104. According to one embodiment, the chart 701 relates an overall health metric 704 to time 702. In various embodiments, the chart 701 includes a machine health trend 703 that includes values of an overall health metric 701 associated with particular times 702. In one or more embodiments, the chart 701 includes a threshold 705 representing a predetermined minimum value of the overall health metric 704 that is associated with a pre-error or error performance state of the machine 104. According to one embodiment, the threshold 705 is an upper confidence limit of a distribution of summed deviation values computed from one or more optimal runtime datasets.

In at least one embodiment, the chart 701 includes an error event trend 707 for tracking error events experienced by the machine 104. In at least one embodiment, the error event trend occurs at overall health metric values 704 of 0.0 and 1.0 (e.g., 0.0 representing no detected error event and 1.0 representing a detected error event. In one example, the error event trend 707 denotes an error event, such as a paper break, that occurred at a time 702 of −1:00 (e.g., a time interval 1 hour prior to a current time 702, indicated by a value of 0:00 on the chart 701).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and methods may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the processes disclosed herein. The particular sequence of such executable instructions or associated data structures represent examples of corresponding acts for implementing the functions described in such steps.

Those skilled in the art will also appreciate that the claimed and/or described systems and processes may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and methods are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and methods are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and methods is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and processes of the claimed systems and methods will be readily discernible from the description herein, by those of ordinary skill in the art. Many embodiments and adaptations of the disclosure and claimed systems and methods other than those herein described, as well as many variations, modifications, and equivalent arrangements and processes, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and methods. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and methods. In addition, some steps may be carried out simultaneously, contemporaneously, or in synchronization with other steps.

The embodiments were chosen and described in order to explain the principles of the claimed systems and methods and their practical application so as to enable others skilled in the art to utilize the systems and methods and various embodiments and with various modifications as are suited to the particular use contemplated. Alternative embodiments will become apparent to those skilled in the art to which the claimed systems and methods pertain without departing from their spirit and scope. Accordingly, the scope of the claimed systems and methods is defined by the appended claims rather than the foregoing description and the exemplary embodiments described therein.

What is claimed is:

1. A method for optimizing machine operation, comprising:
    determining, based at least in part on a multivariate model, a respective pre-error set-point for a plurality of data sources associated with a machine;
    receiving operating data from at least one of the plurality of data sources, the at least one of the plurality of data sources being selected based at least in part on a corresponding mutual information correlation value and a corresponding importance value;
    comparing the operating data to each pre-error set-point to determine whether the operating data corresponds to a pre-error machine state;
    outputting a corrective action when the operating data corresponds to the pre-error machine state; and
    controlling operation of the machine based at least in part on the corrective action.

2. The method of claim 1, wherein each data source corresponds to a physical sensor operatively connected to the machine.

3. The method of claim 1, further comprising generating a visualization of the comparison of the operating data to each respective pre-error set-point for the plurality of data sources.

4. The method of claim 3, wherein the visualization comprises an intensity map.

5. The method of claim 1, the corrective action including an alert.

6. The method of claim 1, the corrective action including a command signal to change operation of the machine.

7. The method of claim 1, further comprising identifying the at least one of the plurality of data sources as a set of the plurality of data sources corresponding to most-predictive data sources as identified within a ranking.

8. The method of claim 7, the ranking ordering each of the plurality of data sources based at least in part on a combined score for each data source, the combined score based at least in part on the corresponding mutual information correlation value and the corresponding importance value of each data source;
    wherein the corresponding mutual information correlation value quantifies each data source based at least in part on a variable from at least one other of the plurality of data sources;
    wherein each corresponding importance score indicates a metric of predictiveness for the pre-error machine state.

9. The method of claim 1, wherein the comparing the operating data includes calculating a deviation of the operating data associated with each data source to the respective pre-error set-point for said each data source.

10. The method of claim 9, wherein the comparing the operating data further includes assessing the deviation using an importance score for each data source, each importance score indicating a metric of predictiveness for the pre-error machine state.

11. The method of claim 1, further comprising:
determining, based at least in part on an optimal multivariate model, an optimal set-point for each data source of the plurality of data sources;
determining one or more deviations between the operating data and each optimal set-point; and determining an overall health metric of the machine based at least in part on the one or more deviations.

12. The method of claim 11, further comprising, in response to the overall health metric exceeding a predetermined threshold, outputting an action with respect to the machine.

13. A method for optimizing machine operation, comprising:
determining, based at least in part on an optimal multivariate model, an optimal set-point for each data source of a plurality of data sources associated with a machine;
receiving operating data from at least one of the plurality of data sources, the at least one of the plurality of data sources being selected based at least in part on a corresponding mutual information correlation value and a corresponding importance value;
determining one or more deviations between the operating data and each optimal set-point;
determining an overall health metric of the machine based at least in part on the one or more deviations; and
controlling operation of the machine based at least in part on the overall health metric.

14. The method of claim 13, wherein each data source corresponds to a physical sensor operatively connected to the machine.

15. The method of claim 13, further comprising generating a visualization of the comparison of the operating data to each respective optimal set-point for the plurality of data sources.

16. The method of claim 15, wherein the visualization comprises an intensity map.

17. The method of claim 13, further comprising initiating a corrective action in response to one or more deviations meeting or exceeding a threshold.

18. The method of claim 17, the corrective action including an alert.

19. The method of claim 17, the threshold including a set of thresholds representing boundary conditions indicating optimal performance of the machine.

20. The method of claim 19, each set of thresholds corresponding to an intensity scale used to generate an intensity map.

21. The method of claim 13, the optimal set-point including a plurality of optimal set-points each corresponding to a grade of product produced using the machine, the determining deviations including comparing ones of the plurality of optimal set-points corresponding to a specific grade of product being produced using the machine.

22. A method for generating a machine learning model to classify data source data sets associated with a machine, comprising:
retrieving historical data corresponding to operation of a machine, wherein the historical data comprises readings from a plurality of data sources associated with the machine;
generating a training dataset for training the machine learning model based at least in part on the historical data, wherein the training dataset comprises:
a first subset of the readings associated with a plurality of optimal runtime time intervals for the machine; and
a second subset of the readings associated with a plurality of pre-error time intervals for the machine;
training the machine learning model to classify data source datasets as either optimal runtime or pre-error using the training dataset;
outputting the machine learning model for analysis of machine operation; and
controlling the machine operation based at least in part on the machine learning model.

23. The method of claim 22, further comprising using the machine learning model to generate a multivariate model, wherein generating the multivariate model includes:
generating, from the trained machine learning model, an importance value for each of the plurality of data sources, wherein the importance value comprises a respective measure of statistical importance for each data source in contributing to classification of the training dataset by the trained machine learning model as optimal;
generating a correlation value for each of the plurality of data sources, wherein the correlation value comprises a measure of a correlation between each respective data source and a classification of the training dataset as optimal by the machine learning model; and
generating the multivariate model based at least in part on the importance values and the correlation values for each of the plurality of data sources.

24. The method of claim 23, wherein generating the multivariate model further comprises:
initializing the multivariate model with a predictive subset of the plurality of data sources determined based at least in part on the importance value and the correlation value of each of the plurality of data sources; and
training the multivariate model to simulate an optimal performance state of the machine, wherein the training is performed using a segment of the first subset corresponding to the predictive subset.

25. The method of claim 23, further comprising:
combining the importance value and the correlation value for each of the plurality of data sources to generate a combined value; and
generating a ranking of the plurality of data sources based at least in part on the combined value for each of the plurality of data sources.

26. The method of claim 22, further comprising:
using the machine learning model to generate a ranking of the plurality of data sources based at least in part on predictiveness to optimal or pre-break machine state; and
outputting the ranking.

* * * * *